(12) United States Patent
Canfield et al.

(10) Patent No.: US 11,480,491 B1
(45) Date of Patent: Oct. 25, 2022

(54) METHOD FOR DETERMINING VIBRATIONAL ANOMALIES OF A VEHICLE

(71) Applicant: BALANCED ENGINEERING SOLUTION, LLC, Towson, MD (US)

(72) Inventors: Eric L. Canfield, Downingtown, PA (US); Robert P. Alston, Exton, PA (US); David M. Scribner, Viera, FL (US); Melody Gao, Downingtown, PA (US); Andrew Babala, Glenmoore, PA (US); Kevin Codd, Downingtown, PA (US); David A. Fenimore, Coatesville, PA (US); Ryan Mendenhall, Coatesville, PA (US); Kavish V. Sani, Chester Springs, PA (US); Rishi Kumar, Downingtown, PA (US); Savar R. Amin, Malvern, PA (US); Pablo A. Rodriguez, South Coatesville, PA (US)

(73) Assignee: BALANCED ENGINEERING SOLUTION, LLC, Towson, MD (US)

( * ) Notice: Subject to any disclaimer, the term of this patent is extended or adjusted under 35 U.S.C. 154(b) by 0 days.

(21) Appl. No.: 17/670,664

(22) Filed: Feb. 14, 2022

(51) Int. Cl.
  *G01M 1/16* (2006.01)
  *G01M 1/02* (2006.01)

(52) U.S. Cl.
  CPC ............... *G01M 1/16* (2013.01); *G01M 1/02* (2013.01)

(58) Field of Classification Search
  CPC .................................. G01M 1/02; G01M 1/16
  See application file for complete search history.

(56) References Cited

U.S. PATENT DOCUMENTS

| 3,888,128 | A  | 6/1975 | Mitchell |
| 5,443,537 | A  | 8/1995 | Haskins |
| 6,595,053 | B2 | 7/2003 | Parker |
| 6,622,389 | B1 | 9/2003 | Pellegrino |

(Continued)

FOREIGN PATENT DOCUMENTS

| EP | 3839468 A1 * | 6/2021 | ............... G01M 1/02 |
| WO | WO-2021166412 A1 * | 8/2021 | |

OTHER PUBLICATIONS

Bee Line, on vehicle wheel balancing, www.beeline-co.com/products/wheel-balancing, 2 pages (2021).

(Continued)

*Primary Examiner* — Natalie Huls
(74) *Attorney, Agent, or Firm* — Panitch Schwarze Belisario & Nadel LLP

(57) ABSTRACT

A method is disclosed for determining vibrational anomalies of a vehicle. An object is removably attached to a wheel of the vehicle in a manner that inhibits the object from coming off of the vehicle when the vehicle is in operation. The object includes one or more inertial measurement units (IMU's) mounted to the object and configured to measure parameters that are used for calculating the vibrational anomalies when the vehicle is in operation. Motion data captured by the one or more IMU's is collected. The collected motion data is processed to determine the presence of one or more vibrational anomalies of the vehicle. A recommended corrective action to be taken is determined when the result of the processed data indicates the presence of one or more vibrational anomalies of the vehicle.

5 Claims, 22 Drawing Sheets

(8 of 22 Drawing Sheet(s) Filed in Color)

(56) References Cited

U.S. PATENT DOCUMENTS

| | | | |
|---|---|---|---|
| 7,117,603 | B1 | 10/2006 | Pellegrino |
| 7,478,482 | B1 | 1/2009 | Pellegrino |
| 7,578,066 | B1 | 8/2009 | Pellegrino |
| 7,926,189 | B1 | 4/2011 | Pellegrino |
| 9,387,734 | B1* | 7/2016 | Alhazmi ............. B60C 23/0459 |
| 9,645,037 | B2 | 5/2017 | Meyer et al. |
| 10,284,752 | B1 | 5/2019 | Canfield et al. |
| 10,969,292 | B2 | 4/2021 | Canfield et al. |
| 2005/0247130 | A1 | 11/2005 | Takada et al. |
| 2006/0010992 | A1 | 1/2006 | Shima et al. |
| 2008/0185106 | A1 | 8/2008 | Farley et al. |
| 2009/0314075 | A1* | 12/2009 | Albohr ................ G01M 17/025 73/146 |
| 2010/0139397 | A1* | 6/2010 | Braghiroli ............. G01M 1/225 73/462 |
| 2010/0288030 | A1 | 11/2010 | Shin et al. |
| 2013/0073224 | A1* | 3/2013 | Oblizajek ............. G01M 17/02 73/146 |
| 2017/0350684 | A1 | 12/2017 | Maliszewski |
| 2018/0003591 | A1* | 1/2018 | Renegar ................ G01M 7/027 |
| 2019/0064027 | A1* | 2/2019 | Leone .................. G07C 5/0841 |
| 2019/0092106 | A1* | 3/2019 | Abdossalami ........ B60C 23/061 |
| 2020/0033220 | A1 | 1/2020 | Raad et al. |
| 2021/0061027 | A1* | 3/2021 | Da Deppo ............. G06N 20/00 |
| 2021/0063267 | A1* | 3/2021 | Canfield ............. G01M 17/022 |
| 2021/0181063 | A1* | 6/2021 | Dodani ................ B60C 23/0401 |
| 2021/0256782 | A1* | 8/2021 | Ehlers .................. G07C 5/0816 |

OTHER PUBLICATIONS

Bee Line, on vehicle wheel balancing, www.beeline-co.com/products/wheel-balancing, 5 pages (2021).

Ford F150 2004-2014 Center Cap, Copyright © 2019 centercaps. net, 2 pages.

International Preliminary Report on Patentability dated Aug. 25, 2021 in International Application No. PCT/US2020/044692.

International Search Report and Written Opinion dated Oct. 27, 2020 in International Application No. PCT/US2020/044692.

Product brochure for Road Force Elite® wheel balancer, Hunter Engineering Company, Copyright © 2018, 16 pages.

Tru Align: The Universal Wheel Alignment Adapter Kit. Printout from Wayback Machine web page: <https://web.archive.org/web/20190820155325/https://trualign.com/>, printout date: Apr. 1, 2021, web page captured on Aug. 20, 2019, 10 pages.

Yosoo Wheel Balancer Kit. Amazon ASIN #B08R9PCHZT, date first available on Amazon: Dec. 25, 2020, 5 pages.

\* cited by examiner

Example of Bit Count Data

| AccelX | AccelY | Accel Z | AngVeX | AngVelY | AngVelZ | MagX | MagY | MagZ |
|---|---|---|---|---|---|---|---|---|
| 62384 | 64760 | 48952 | 65527 | 58 | 150 | 101 | 2197 | 64945 |
| 62912 | 64824 | 49512 | 65460 | 1 | 268 | | | |
| 62480 | 64680 | 48992 | 3 | 36 | 24 | | | |
| 62600 | 64912 | 49456 | 6 | 67 | 172 | | | |
| 62592 | 64744 | 49744 | 65450 | 53 | 190 | | | |
| 62456 | 64704 | 49464 | 11 | 83 | 136 | | | |
| 62472 | 64568 | 49640 | 65449 | 65527 | 178 | | | |
| 62680 | 64520 | 49792 | 65487 | 65505 | 245 | | | |
| 62624 | 64480 | 49968 | 6 | 72 | 59 | | | |
| 62328 | 64432 | 50024 | 65486 | 65531 | 183 | | | |
| 62640 | 64616 | 50008 | 65446 | 65508 | 271 | 65499 | 305 | 65199 |
| 62408 | 64584 | 49664 | 65487 | 33 | 159 | | | |
| 62608 | 65064 | 49800 | 65500 | 14 | 142 | | | |
| 62768 | 64976 | 49720 | 65525 | 20 | 194 | | | |
| 62504 | 64824 | 49584 | 65519 | 16 | 123 | | | |
| 62480 | 64824 | 49336 | 65489 | 73 | 231 | | | |
| 62752 | 64728 | 49992 | 65535 | 28 | 119 | | | |
| 62448 | 64816 | 49120 | 65465 | 65480 | 59 | | | |
| 62520 | 64968 | 49160 | 65475 | 23 | 119 | | | |
| 62888 | 65128 | 49536 | 16 | 47 | 322 | | | |
| 62328 | 65088 | 49296 | 65508 | 70 | 99 | 65497 | 309 | 65201 |
| 62296 | 65056 | 49120 | 65522 | 32 | 47 | | | |
| 62392 | 64976 | 49176 | 25 | 53 | 139 | | | |
| 62312 | 64944 | 49120 | 65452 | 81 | 87 | | | |
| 62248 | 65032 | 49264 | 65506 | 39 | 18 | | | |
| 62504 | 65136 | 49248 | 20 | 66 | 152 | | | |
| 62048 | 64968 | 48944 | 65463 | 65421 | 242 | | | |
| 62488 | 64864 | 49120 | 65526 | 39 | 20 | | | |
| 62392 | 64832 | 49104 | 65531 | 45 | 138 | | | |
| 62352 | 64968 | 49184 | 65453 | 65502 | 182 | | | |
| 62368 | 65064 | 49320 | 65524 | 44 | 65529 | 65495 | 311 | 65201 |
| 62320 | 65200 | 49696 | 65464 | 32 | 209 | | | |
| 62360 | 65128 | 49488 | 65472 | 76 | 272 | | | |
| 62216 | 65136 | 49792 | 65514 | 69 | 29 | | | |
| 62544 | 65096 | 49952 | 65527 | 39 | 176 | | | |
| 62216 | 65184 | 49904 | 65508 | 45 | 226 | | | |

Figure 1

METHOD FOR DETERMINING VIBRATIONAL ANOMALIES OF A VEHICLE

BACKGROUND OF THE INVENTION

"Tire balance" refers to the distribution of mass within a vehicle tire or the entire wheel, including the rim, on which the vehicle tire is mounted. Tire balance may also be referred to as "tire unbalance" or "tire imbalance." As described in U.S. Pat. No. 6,595,053 (Parker), which is incorporated by reference herein, the balancing of vehicle wheel assemblies is most often accomplished by removing the tire/wheel assemblies from the vehicle and mounting each of the tire/wheel assemblies on an off-car-balancer. The off-car balancer rotates the tire/wheel assembly, measures the imbalance forces, and displays the amount and location of weight to add to the wheel to bring the tire/wheel assembly into a balanced condition. One example of an off-car balancer is The Road Force® Elite wheel balancer, which is commercially available from Hunter Engineering Company, Bridgeton, Mo.

As also described in U.S. Pat. No. 6,595,053, a tire/wheel assembly may be balanced so that it produces negligible forces when rotated on the off-car balancer, but the same assembly may cause significant imbalance forces when mounted on the vehicle and rotated using the vehicle's bearings and axle. The imbalance forces of a tire/wheel assembly will remain constant between the off-car balancer and the vehicle only if the relationship between the tire/wheel assembly and the axis of rotation is the same for the two mountings. Achieving the desired on-car wheel balance with only an off-car balancer involves both accurately mounting the wheel on the balancer and then accurately mounting the tire/wheel assembly on the vehicle's hub. Possible causes of wheel-to-vehicle mounting inaccuracy include clearance between the balancer hub and the rim pilot hole, runout of the hub pilot diameter or mounting face, rust or grime between rim and vehicle hub, runout in studs and runout in lug nuts.

As further described in U.S. Pat. No. 6,595,053, on-car balancers can eliminate some of the mounting accuracy problems by performing the balance measurements after the tire/wheel assembly is in its final mounted position on the vehicle. Although on-car balancers are available, they are not very popular because of setup difficulties, operational limitations, and safety issues. There are two aspects of on-car balancing. First, data must be collected. Second, the data must be analyzed to determine what, if any, action needs to be taken to correct any detected imbalance forces.

U.S. Pat. No. 10,969,292 (Canfield et al.), which is incorporated herein by reference, discloses an on-car balancer apparatus (interchangeably referred to herein as "Platen") that is inexpensive, convenient to use, and can capture parameters necessary for calculating vibrational forces when the vehicle is in operation. This device aids with the first of the two aspects of on-car balancing, data collection. The apparatus in U.S. Pat. No. 10,969,292 is configured to receive one or more inertial measurement units (IMU's) mounted thereto for measuring parameters that are used for calculating the imbalance forces during motion of the vehicle. Accordingly, U.S. Pat. No. 10,969,292 addresses the first aspect of data collection. The present invention addresses the second aspect regarding the data analysis. Furthermore, the data analysis described herein is not limited to a specific type of a vehicle, such as a passenger vehicle or truck, but has applicability to other forms of vehicles, such as railcars which have railcar wheels that also experience imbalance forces.

SUMMARY OF THE PRESENT INVENTION

In one preferred embodiment, a method is disclosed for determining vibrational anomalies of a vehicle. An object is removably attached to a wheel of the vehicle in a manner that inhibits the object from coming off the vehicle when the vehicle is in operation. The object includes one or more IMU's mounted to the object and configured to measure parameters that are used for calculating the vibrational anomalies when the vehicle is in operation. Motion data captured by the one or more IMU's is collected. The collected motion data is processed to determine the presence of one or more vibrational anomalies of the vehicle. A recommended corrective action to be taken is determined when the result of the processed data indicates the presence of one or more vibrational anomalies of the vehicle.

BRIEF DESCRIPTION OF THE DRAWINGS

The patent or application file contains at least one drawing executed in color. Copies of this patent or patent application publication with color drawings will be provided by the Office upon request and payment of the necessary fee.

Preferred embodiments of the present invention will now be described by way of example with reference to the accompanying drawings:

FIG. 1 is an example of collected motion data for use with preferred embodiments of the present invention.

DETAILED DESCRIPTION OF THE INVENTION

Figure 2A:
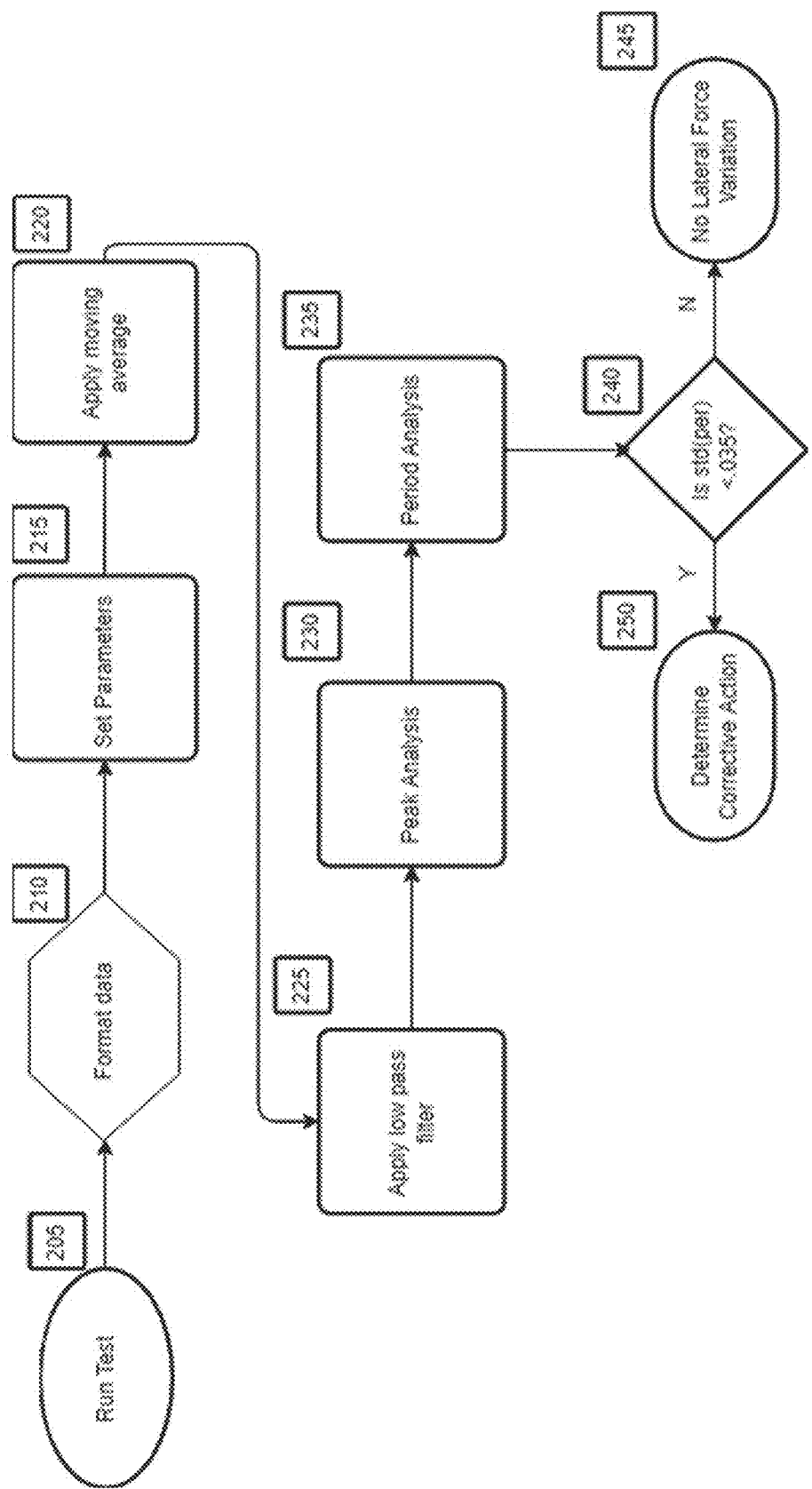
FIGS. 2A and 2B, taken together, is a flowchart of one preferred embodiment of a process for determining lateral force variation and the recommended corrective action(s).

Certain terminology is used herein for convenience only and is not to be taken as a limitation on the present invention.

The words "a" and "an", as used in the claims and in the corresponding portions of the specification, mean "at least one."

The discussion below refers to "vibrations" and "translational vibrations." Some vibrations are the result of translational forces, whereas other vibrations are not the result of translational forces. One type of translational vibration is "imbalance forces." The present invention determines the presence of one or more "vibrational anomalies." In one embodiment, the vibrational anomaly or anomalies are those of a vehicle. In another embodiment, the vibrational anomaly or anomalies are those of a tire/hub assembly.

The discussion below also refers to a vehicle being "in operation." For a passenger vehicle or truck (e.g., a motor vehicle, an electric vehicle (EV)), "in operation" includes having the vehicle in motion or having the vehicle's engine on (in the case of a motor vehicle), but not necessarily having the vehicle in motion. For other types of vehicles, such as railcars, being "in operation" requires having the vehicle in motion.

The various embodiments described below each make use of one or more IMU's. Any IMU may be used that has a form factor and durability suitable for the environment described herein. One suitable IMU is the IMU described in U.S. Pat. No. 10,284,752 (Canfield et al.), which is incorporated herein by reference. Sample measured parameters, which are used for calculating the imbalance forces during motion of the vehicle, are captured by one or more IMU's. These parameters include, but are not limited to, linear acceleration and angular velocity.

I. Determination of Vibrational Anomalies of a Vehicle

One preferred embodiment of the present invention determines vibrational anomalies of a vehicle using the following process:

1. An object is removably attached to a wheel of the vehicle in a manner that inhibits the object from coming off the vehicle when the vehicle is in operation. The object includes one or more IMU's mounted to the object and configured to measure parameters that are used for calculating the vibrational anomalies when the vehicle is in operation. One suitable object is any one of the apparatuses shown in U.S. Pat. No. 10,969,292. In these embodiments, the object is removably attached to a tire/hub assembly of the wheel of the vehicle via lug nuts of the tire/hub assembly. However, other objects and attachment mechanisms are within the scope of the present invention. The object is also interchangeably referred to herein as "device."

2. Collect motion data captured by the one or more IMU's. One example of collected motion data is shown in FIG. 1. This data contains 9 degrees of freedom as follows:

i. linear acceleration (measured by an accelerometer) in all three axes (x, y, and z), ii. angular velocity (measured by a gyroscope) in all three axes (interchangeably referred to herein as "AngVel" and "gyro"), iii. magnetic field strength (measured by a magnetometer) in all three axes.

Figure 12A:
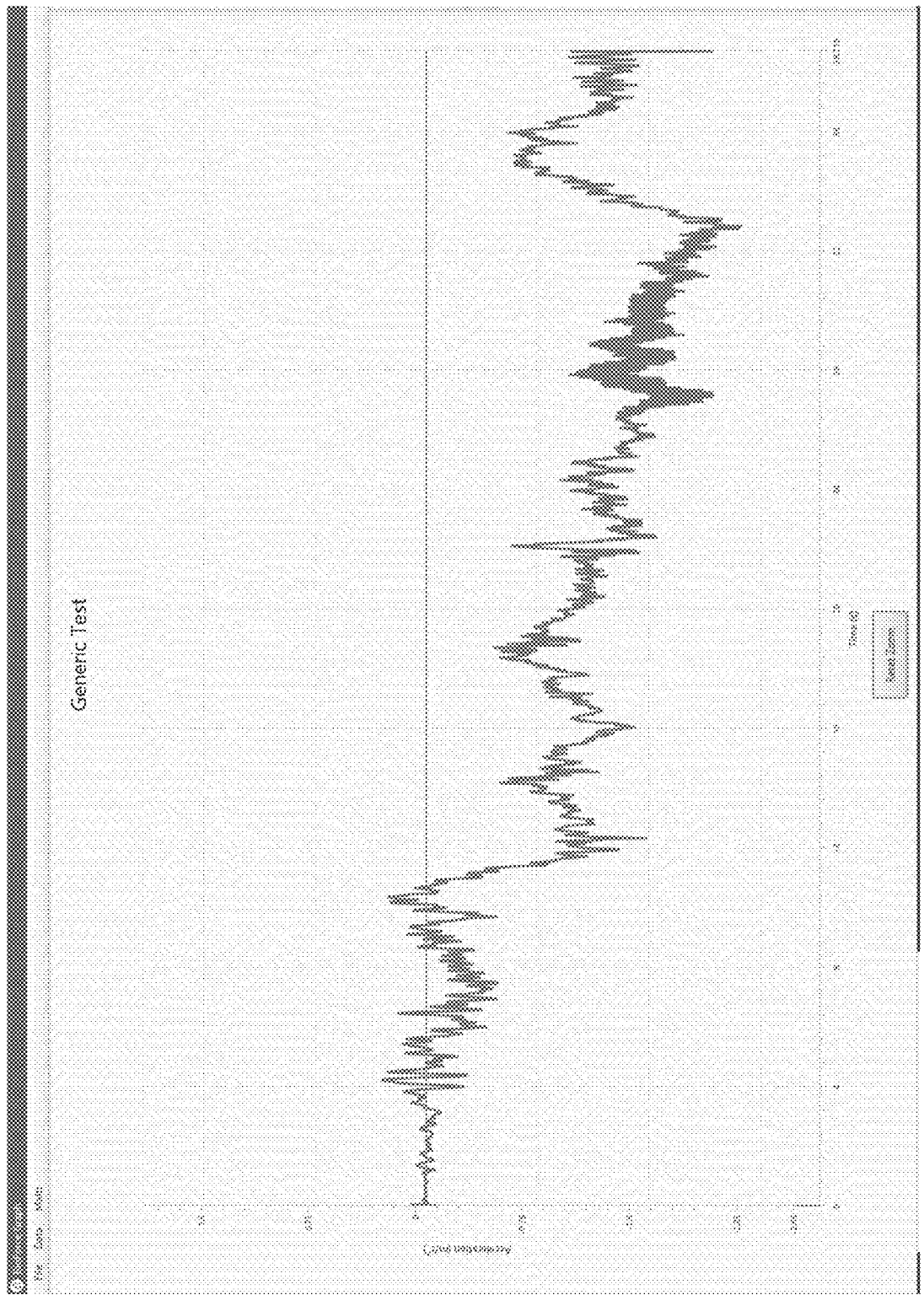
FIG. 12A one section of a graph application used in one preferred embodiment of the present invention.
Figure 12B:
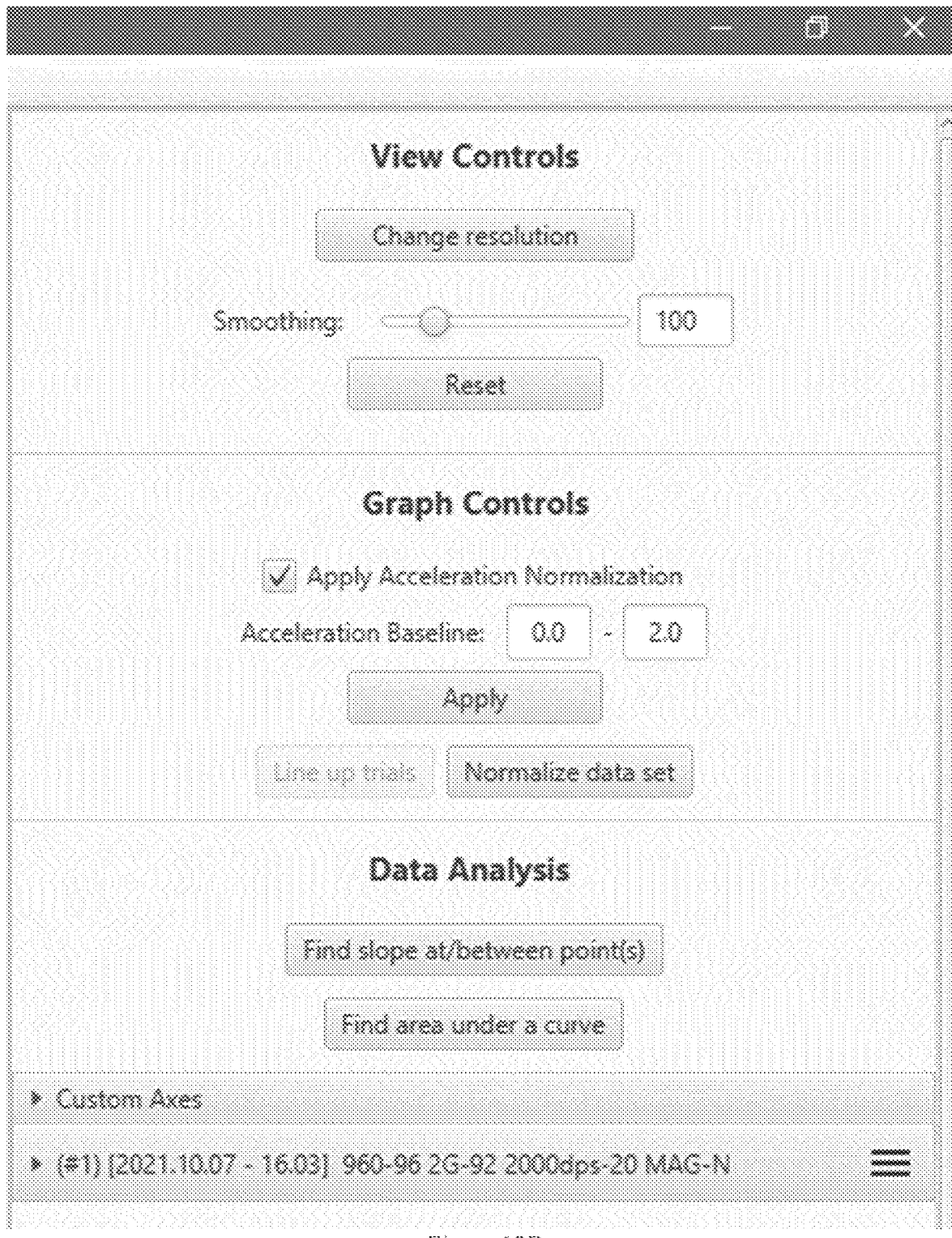
FIG. 12B is a control panel of FIG. 12A.

The motion data is originally displayed in bit count (a value from 0-65536) in 9 columns, as shown in FIG. 1. More specifically, the first three columns represent linear acceleration in the x, y and z directions respectively. The next three columns represent angular velocity in the x, y, and z directions respectively. The last three columns represent the magnetic field strength in the x, y, and z directions respectively. Depending upon the parameters set on the device, each value in this data set will correspond to a reading for that column thus making this two's complement data. (These parameters are set up on the IMU prior to collecting the data.) For instance, if the sensitivity for the accelerometer is set to 2 g then a value of 32,767 in the first column would correspond to a reading of 19.6 m/s$^2$. A value of 32,768 in the first column would correspond to a reading of −19.6 m/s$^2$. As the bit count value goes from 32,768 to 65,536 the reading goes from −19.6 m/s$^2$ to 0 m/s$^2$. That conversion from bit count to motion data is completed during the analysis of the data. Data for the magnetic field strength is only collected once for every 10 data points collected for the other columns. Thus, if data is collected at 960 Hz (the default data collection rate) for linear acceleration and angular velocity, then data is collected for the magnetic field strength at a rate of 96 Hz. At that collection rate, the 36 rows of displayed data represent 36/960 seconds (0.0375 s) of data. When this data is manipulated during the analysis, a data frame is created which includes these columns and another column for time that is inserted before these columns. Thus, the data frame has 10 columns: time, accelx, accely, accelz, gyrox, gyroy, gyroz, magx, magy, and magz). This data is then manipulated within a graphing platform. One such platform is shown in FIG. 12A and FIG. 12B so that it presents the actual values for each column. The acceleration is presented in meters per second, the angular velocity is presented as degrees per second, and the magnetometer is presented as micro Tesla (µT).

3. The collected motion data is processed to determine the presence of one or more vibrational anomalies of the vehicle. In one embodiment, this involves determining the magnitude and location of the one or more vibrational anomalies of the vehicle.

4. A recommended corrective action to be taken is determined when the result of the processed data indicates the presence of one or more vibrational anomalies of the vehicle.

A. Vibrational Anomaly is Caused by Lateral Force Variation

In one preferred embodiment wherein, the vehicle is a motor vehicle or an electric vehicle, the determined vibrational anomaly may be caused by lateral force variation. If so, examples of the recommended corrective action include resetting lug nuts of the wheel or inspecting the wheel's rim for potential bent regions.

Figure 2B:
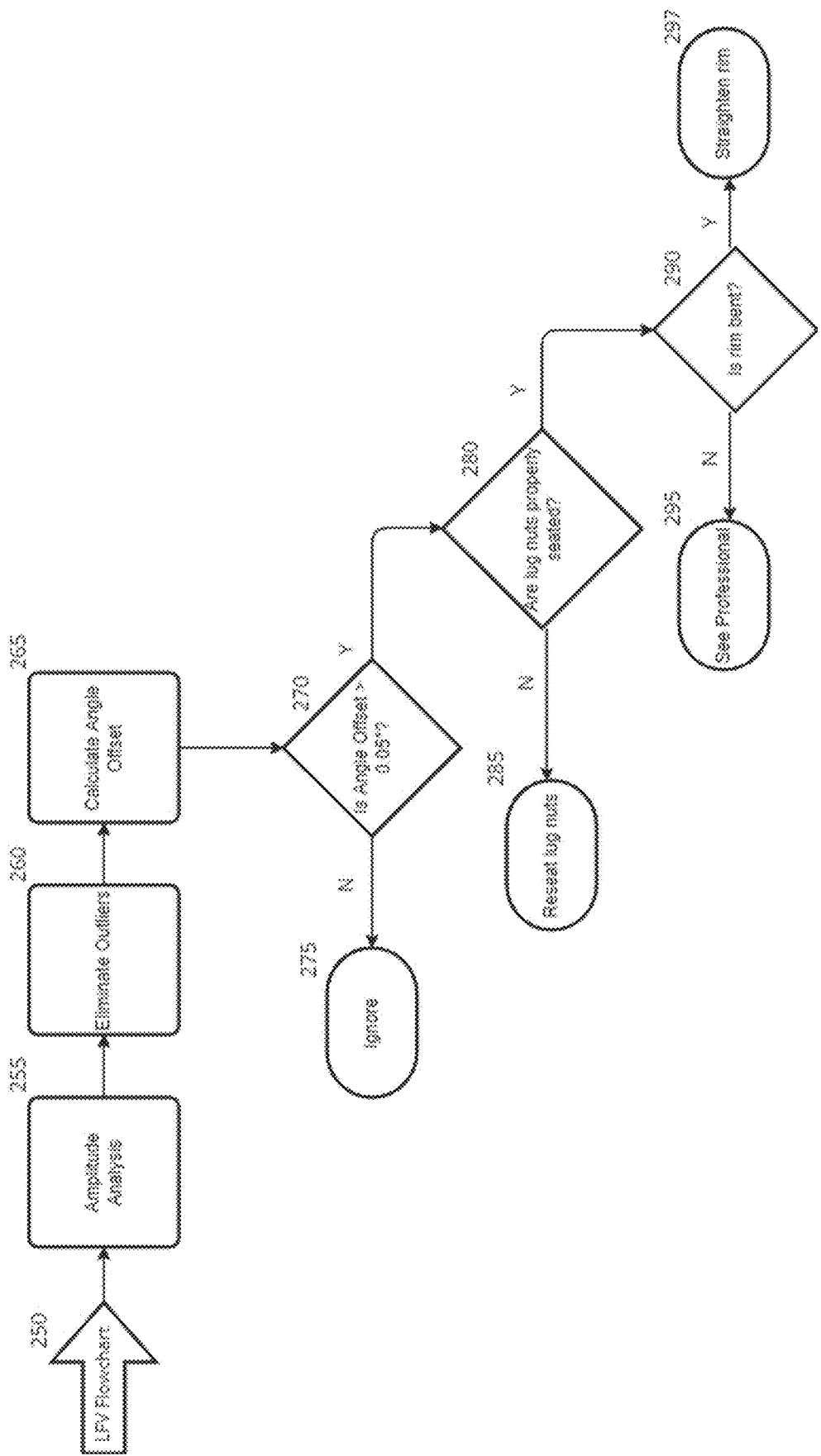

FIGS. 2A and 2B, taken together, is a flowchart of one preferred embodiment of a process for determining lateral force variation and the recommended corrective action(s). The steps and outcomes of the flowchart are as follows:

205 Run Test according to Steps in the Data Collection Process

1) Locate a road that allows the vehicle to attain the top speed needed for the trial and slow to a stop safely.
2) Prepare Device with trial parameters. These parameters include data collection rate, sensor sensitivity and filter cutoff.
3) Insert Device into Platen.
4) Affix Platen to tire.
5) Pull vehicle into its starting position and come to rest.

6) Begin Data Acquisition.
7) Accelerate steadily to a speed of 15 mph.
8) Maintain that speed for 4 seconds.
9) Accelerate to the speed at which the quality of ride issue arises.
10) Release the accelerator and continue in a straight line on a level, smooth road for at least 4 seconds.
11) Slow to a stop.
12) Stop Data Acquisition.
13) Download data onto computer.

210 Format Data—Create a one-to-one relationship between time and the corresponding data.

For an application such as Excel, this would involve formatting the data into columns (time, accel x, accel y, . . . gyro x . . . ). For an application such as a Python script this returns a Pandas DataFrame.

Figure 3:
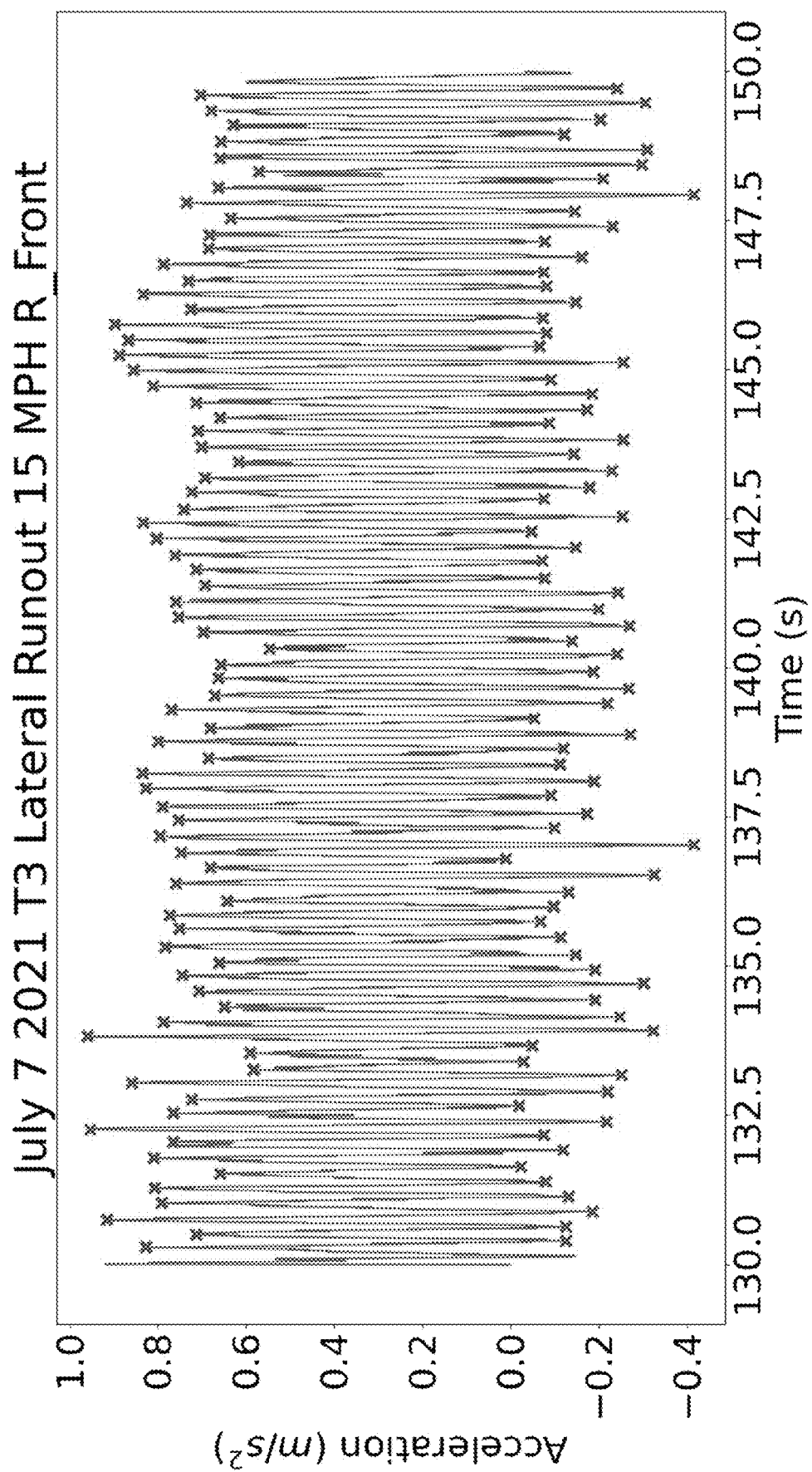
FIG. 3 is an example of lateral runout data that has been collected and analyzed from one preferred embodiment of the present invention.

215 Set parameters for filters
  a. Period is equal to 1/sample rate
  b. Cutoff frequency for low-pass filter used in Step 225
  c. Find data range to be used
    i. Load data into Dashboard graph (from BFA website)
    ii. View AngVelX (angular velocity along the x-axis)
    iii. Find section where AngVelX is relatively constant
220 Apply moving average (smoothing)
225 Apply low pass filter—One example utilizes scipy.signal in Python
230 Do Peak Analysis
  a. Find peaks—One example utilizes scipy.signal.find_peaks( ) with a distance parameter multiplied by 0.7 This locates the peaks of the signal. The same can be done for the relative minimum values. These values are stored in a max/min array.
  b. Returns location (time/data point-x only) of peaks
  c. Repeat a and b for the troughs The result of this process returns the data points for each peak and each trough that are marked by small x's in FIG. 3 which is an example of lateral runout results for a 15 mph test.

235 Period analysis—This determines the period between each pair of peaks and each pair of troughs. This array can be used to find the period by determining the difference in time (x distance) between adjacent relative maxima and relative minima.

240 Determine the standard deviation of the periods found in step 235.
  a. If std(period)≥0.035, 245 there is no Lateral Force Variation. "std(period)" is the standard deviation of all of the periods found during Period analysis (step 235)
  b. If std(period)<0.035, 250 determine corrective action
255 Amplitude analysis
  a. Find the amplitude of each peak/trough pair using:

(crest $y$ value–following trough $y$ value)/2 b. Find average and standard deviation. In one embodiment the Python Functions .mean( ) and .std( ) are used.
260 Eliminate outliers using z-score
  a.

$$z \text{ score} = \frac{\text{amplitude} - \text{mean amplitude}}{\text{standard deviation of amplitude}}$$

b. If z-score >2 then eliminate
265 Calculate angle offset using $$\sin\theta = \frac{\text{average amplitude}}{9.8}$$

a. 270 If angle offset is >0.05°, then go to next step
  b. If angle offset is <0.05°, then 275 Ignore
280 Determine if lug nuts are seated properly
  a. If not, 285 reset lug nuts
  b. If yes, go to next step
290 Determine if the rim is bent
  a. If not, 295 see professional
  b. If yes, 297 straighten rim Referring to 230 Peak Analysis of FIG. 2A, to determine if a tire has lateral runout, the visible maximum and minimum values must be determined in order to find amplitude and period. A data frame containing the data collected by the device and a distance parameter is passed into a peak finding function. (This distance parameter will be different for each trial. Thus, it needs to be automated depending on the frequencies evident in the signal. By using gyroX data an estimated period can be found. This is multiplied by a value less than 1 in order to recognize more peaks, due to the inconsistent nature of the data.) This distance parameter (period times 0.7) determines the "minimum horizontal distance in samples between neighboring peaks." The distance parameter is crucial to finding the right maximum and minimum values. This number determines how far apart the algorithm will look for peaks. The graph in FIG. 4 is an exploded view of a section of the graph in FIG. 3 with additional peaks and troughs identified with red and green x's respectively.

Figure 4:
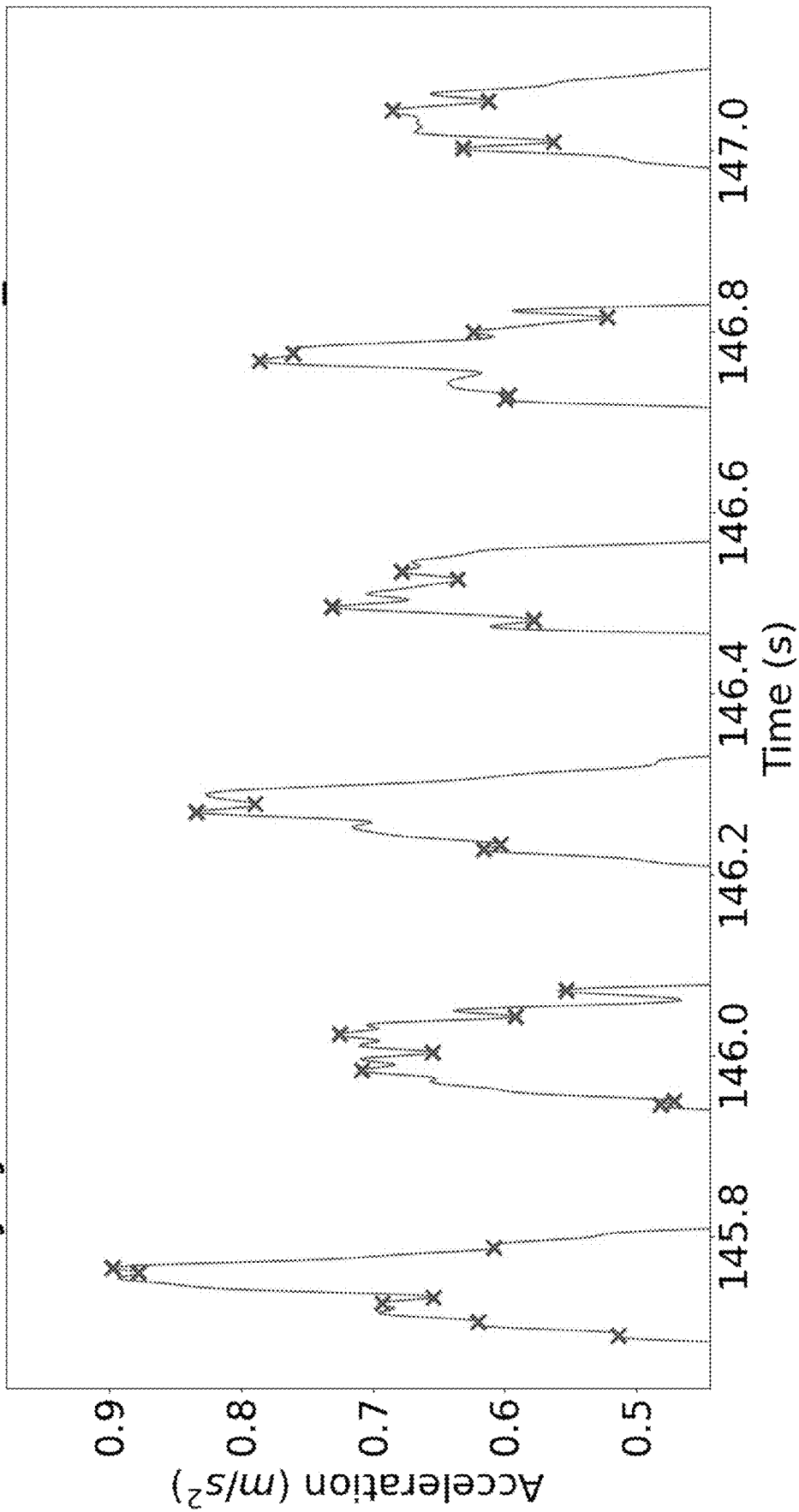
FIG. 4 is an exploded view of a section of the data in FIG. 3. The red x's represent peaks found during the analysis of the data and the green x's represent troughs found during the analysis of the data.

Referring to FIG. 4, between 146.4 seconds and 146.6 seconds it can be seen that multiple peaks have been identified as shown by the red x's. This is what happens when the distance parameter is set to be too small. The algorithm looks for every relative maximum. However, this is not the desired result because these points do not all represent the maximum values of the main sine wave. To rectify this situation, the distance parameter needs to be set to a value.

Figure 5:
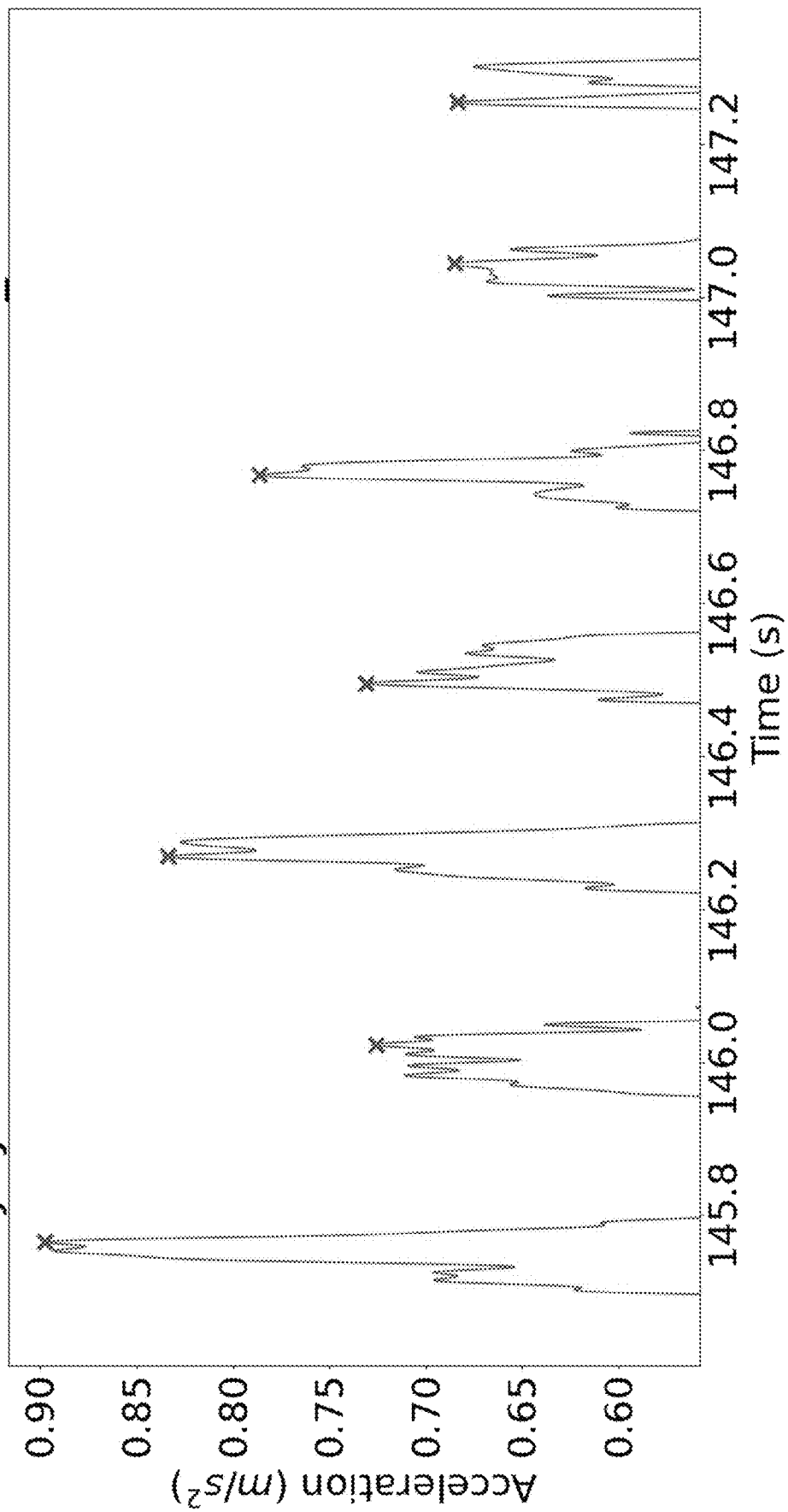
FIG. 5 is the same data as that which is presented in FIG. 4 after further analysis has been completed. Notice the fewer x's.

As shown in FIG. 5, the smaller peaks close to the largest peaks are not marked (by the red x's) as maximums. This is due to the distance parameter which will only search for peaks that are a certain distance apart.

Referring to 255 Amplitude Analysis in FIG. 2B, after finding the distance parameter, the peak finding function is able to return the indices at which the maximum values exist. In order to find the minimum indices, the data is multiplied by −1 and passed into the same function. These indices, returned by the function, are used to find the actual y values (x-acceleration) at the maximum and minimum points. The maximum and minimum values are paired off, subtracted, and divided by two, resulting in a new data frame containing the amplitudes. Using the same indices, the distances between the maximum values and the distances between the minimum values are found by subtracting adjacent indices. The results of the maximum periods and the minimum periods are multiplied by 1 over the sample frequency to convert to units of time and combined into one data frame. Using this data frame and the previously mentioned data frame containing the amplitudes, the average and standard deviation can be found.

B. Vibrational Anomaly is Caused by Radial Force Variation

In one preferred embodiment wherein the vehicle is a motor vehicle or an electric vehicle, the determined vibrational anomaly may be caused by radial force variation. If so, examples of the recommended corrective action include inspecting the wheel's tire for excessive debris and removing any debris or inspecting the wheel's tire for excessive wear in a single location and replacing the tire of the wheel when excessive wear in a single location is located or attaching a mass at a predefined location designated by the application of the wheel's tire.

Figure 6A:
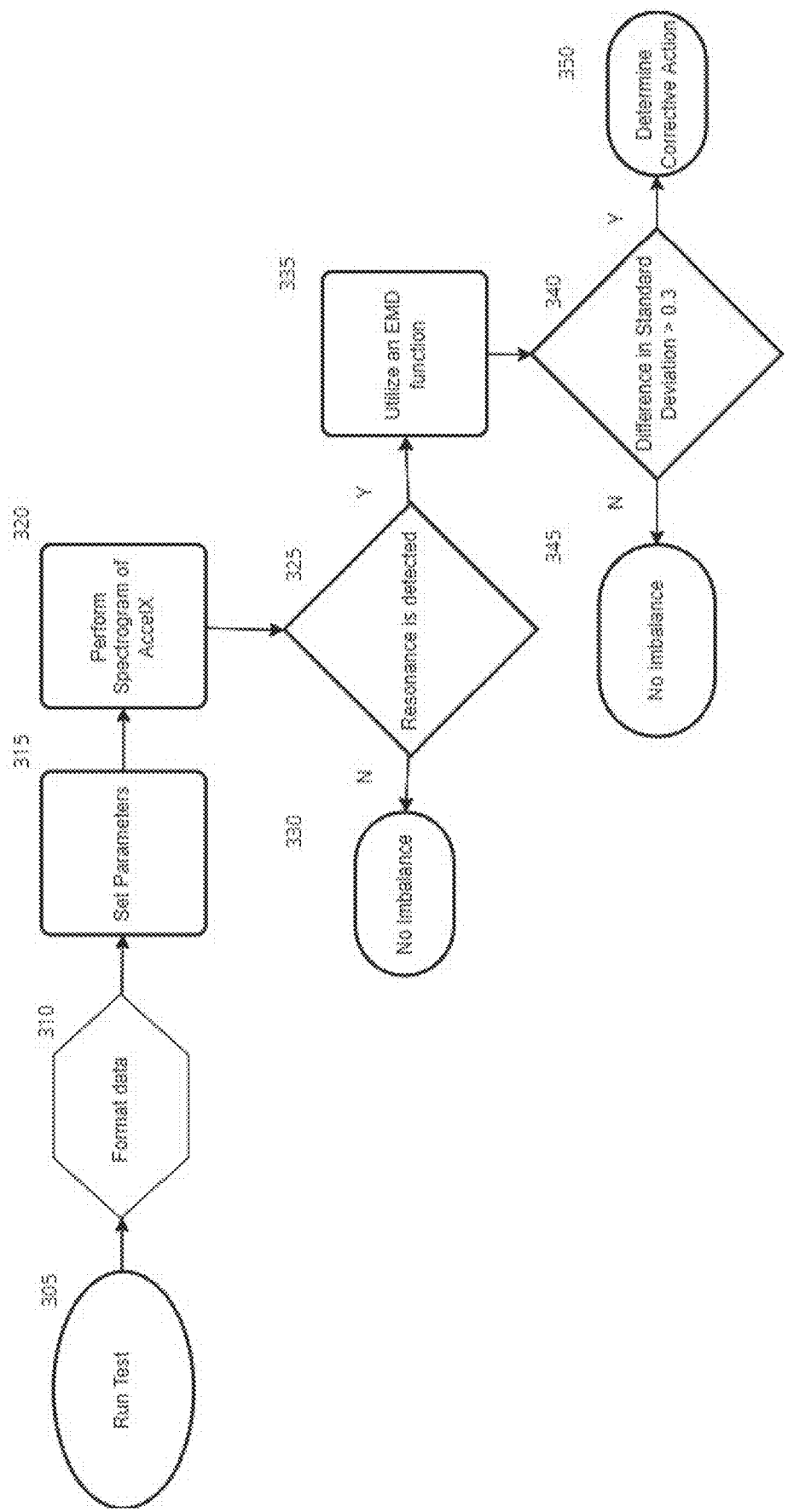
FIGS. 6A and 6B, taken together, is a flowchart of one preferred embodiment of a process for determining radial force variation and the recommended corrective action(s).
Figure 6B:
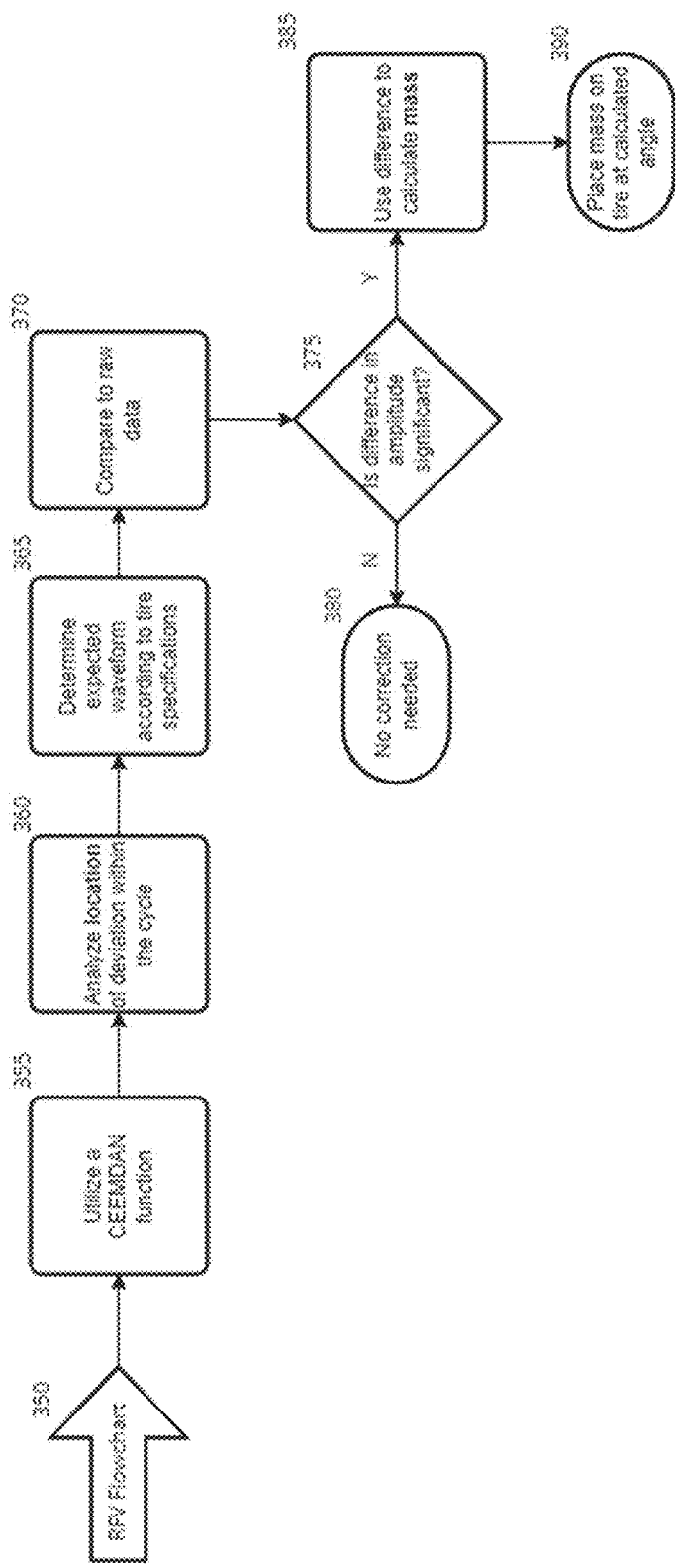

FIGS. 6A and 6B, taken together, is a flowchart of one preferred embodiment of a process for determining radial force variation and the recommended corrective action(s). The steps and outcomes of the flowchart are as follows:

305 Run Test according to Steps in the Data Collection Process
  1) Locate a road that allows the vehicle to attain the top speed needed for the trial and slow to a stop safely.
  2) Prepare Device with trial parameters. These parameters include data collection rate, sensor sensitivity and filter cutoff.
  3) Insert Device into Platen.
  4) Affix Platen to tire.
  5) Pull vehicle into its starting position and come to rest.
  6) Begin Data Acquisition.
  7) Accelerate steadily to a speed of 15 mph.
  8) Maintain that speed for 4 seconds.
  9) Accelerate to the speed at which the quality of ride issue arises.
  10) Release the accelerator and continue in a straight line on a level, smooth road for at least 4 seconds.
  11) Slow to a stop.
  12) Stop Data Acquisition.
  13) Download data onto computer.

310 Format Data—Create a one-to-one relationship between time and the corresponding data.
  For an application such as Excel, this would involve formatting the data into columns (time, accel x, accel y, . . . gyro x . . . ), and returning a data frame. This adds a time column.

315 Set parameters for filters—Period is equal to 1/sample rate

Figure 7:
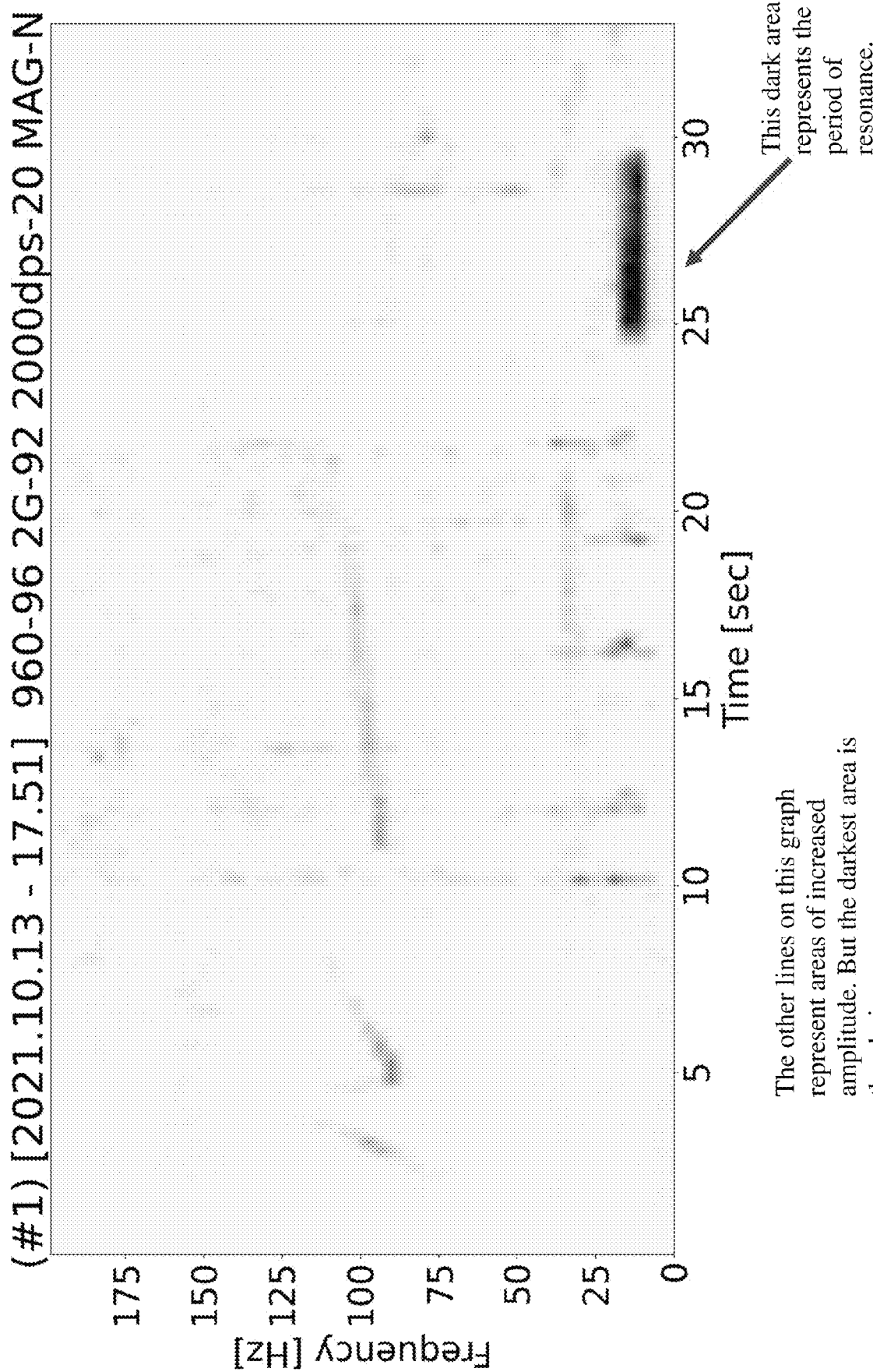
FIG. 7 is a color spectrogram of test data collected from one preferred embodiment of the present invention.

320 Perform a Spectrogram of AccelX—Use a Short-Time Fourier Transformation to determine the range of data to be used for further analysis which is all accomplished by a script
  a. Convert Spectrogram to a computer readable greyscale image. An example of the image produced in this step is shown in FIG. 7 which is a color spectrogram that shows the frequencies of the signals that occur throughout the test. This is the same test that was used for the previous graph shown in FIG. 3. Thus, it is data for a vehicle that accelerates to 55 mph, coasts for several seconds, and then slows to a stop. The darker lines represent stronger signals (signals with a higher amplitude). The amplitude is highest when resonance occurs. Thus, the darkest region shows the resonance from 25-30 seconds as pointed to by the arrow. From that information, the next step can be conducted on this section of the data.
  b. Evaluate greyscale image for resonance
    The dark area pointed out in the lower right corner of the image in FIG. 7 is an indication of resonance. Accordingly, this portion of the data (time span) will be selected by the script.
  c. Use selected portion of dataset for further analysis 335 Utilize an EMD function
  a. Import selected data from the Spectrogram.
  b. Run EMD script—this script will output the standard deviation between the first mode and the original data. (Each mode represents a component of the signal. The first mode will be the normal oscillation of the x-axis without radial force variation.)

Figure 8:
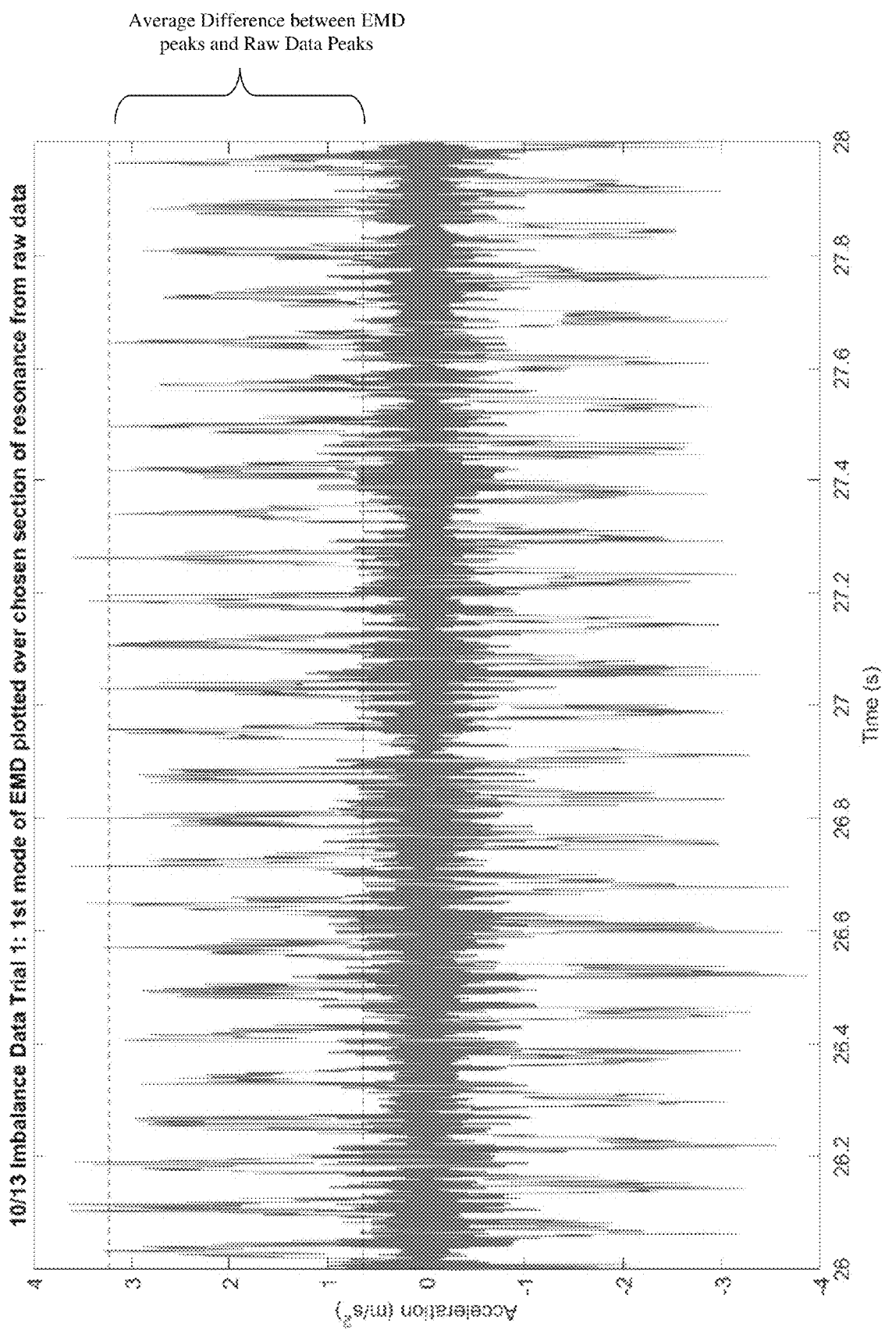
FIG. 8 is a graph of imbalance test data collected from one preferred embodiment of the present invention.

FIG. 8 is a graph that shows the comparison of the first mode to the original data for a tire with imbalance. The data with the higher amplitude (blue) is the original data. The data with the lower amplitude (red) is the first mode. There is a large difference between the two signals.

Figure 9:
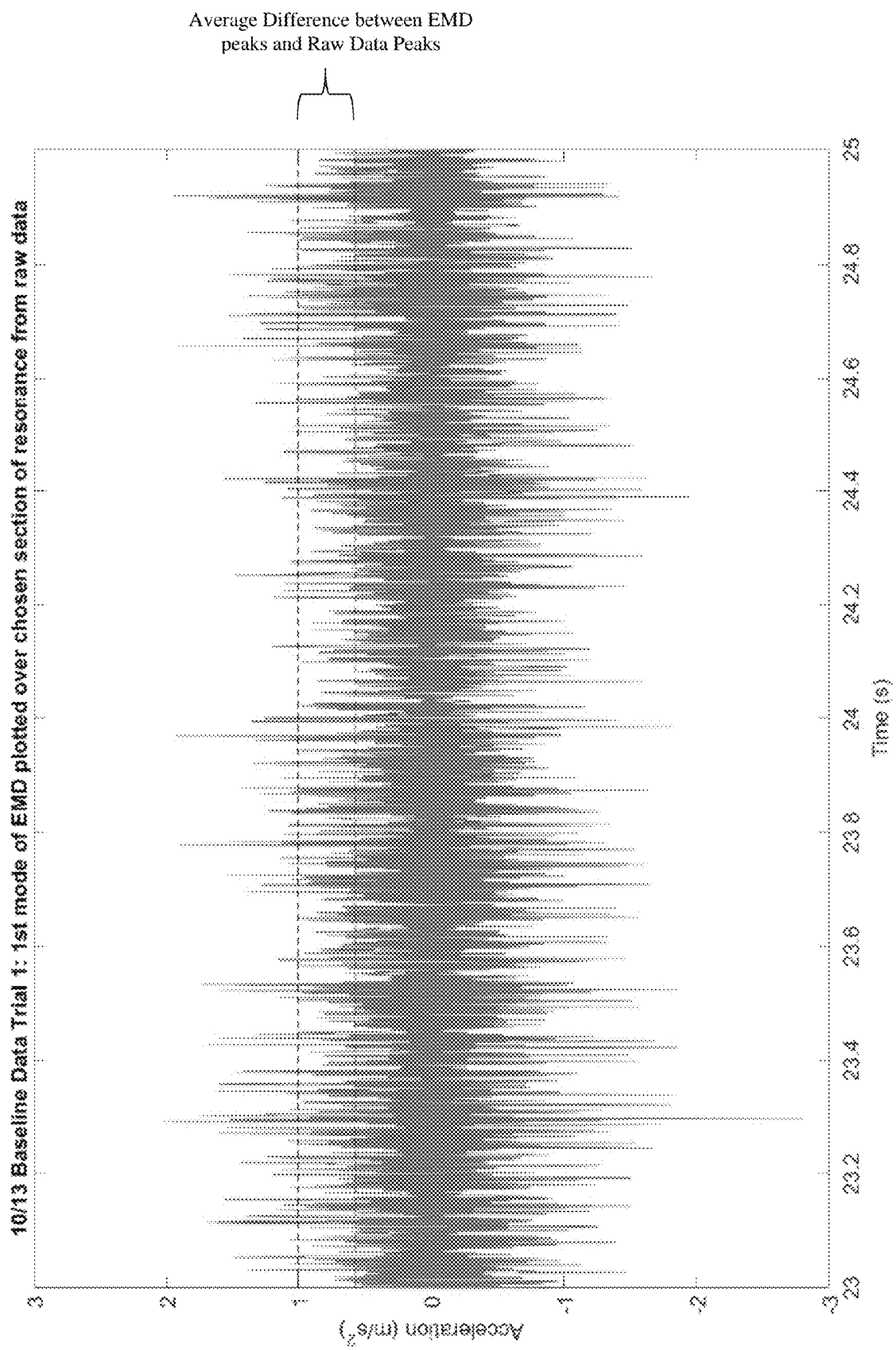
FIG. 9 is a graph of test data for a tire with no imbalance.

FIG. 9 is a graph that shows the comparison of the first mode to the original data for a tire with no imbalance. The data with the higher amplitude (blue) is the original data. The data with the lower amplitude (red) is the first mode. The difference between these two data sets (no imbalance) is much smaller than those in FIG. 8 (with imbalance).

340 Determine the difference in standard deviation between the original data and the first mode
  a. If the difference ≤0.3, 345 there is no imbalance. Check road surface or vehicle for other issues.
  b. If the difference >0.3, 350 determine corrective action 355 Utilize a CEEMDAN Function (CEEMDAN: Complete Ensemble Empirical Mode Decomposition with Adaptive Noise)

Figure 11:
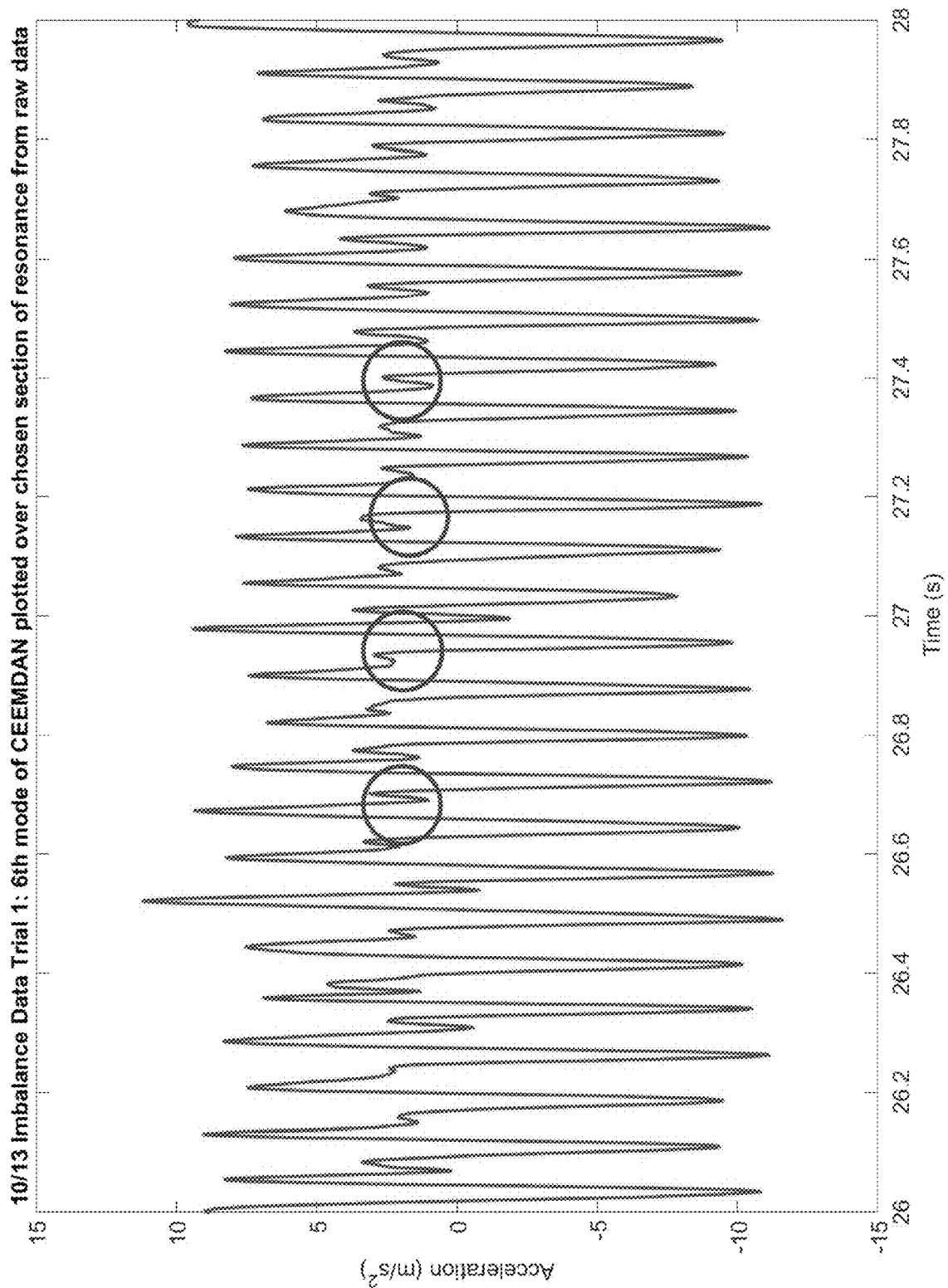
FIG. 11 is a graph of acceleration vs. time for use in illustrating inflection points when collecting data in one preferred embodiment of the present invention.

360 Analyze location of deviation within the cycle
  a. Take second derivative of filtered data to identify inflection points.
  b. Find inflection points which differ from main signal inflection points. These additional inflection points come from the anomaly and are circled in FIG. 11.
  c. Find location (time from peaks) of inflection points within the cycle.
  d. Determine angle from this location using the following equation:

$$\text{angular displacement of anomaly} = \frac{360° * \text{anomaly displacement}}{\text{period}}$$

i. Anomaly displacement is the time from the preceding peak to the inflection point
    ii. Period is the time between consecutive peaks 365 Determine expected waveform according to tire specifications—Period is determined by tire circumference and vehicle speed.

370 Compare to raw data

375 Determine if the difference in amplitude is significant
  a. If not, 280 not correction is needed
  b. If yes, 385 use difference to calculate mass
    i. The magnitude of the imbalance will be related to the amplitude of the signal created by the imbalance. The greater the imbalance, the greater the amplitude of the signal. Therefore, the mass needed to correct the imbalance can be found using this amplitude.
    ii. The difference in amplitude multiplied by the mass of wheel assembly is equal to the centripetal force acting on the corrective mass.
    iii. The mass of the corrective weight is equal to $$m = \frac{F_C * r}{v^2}$$

Figure 10:
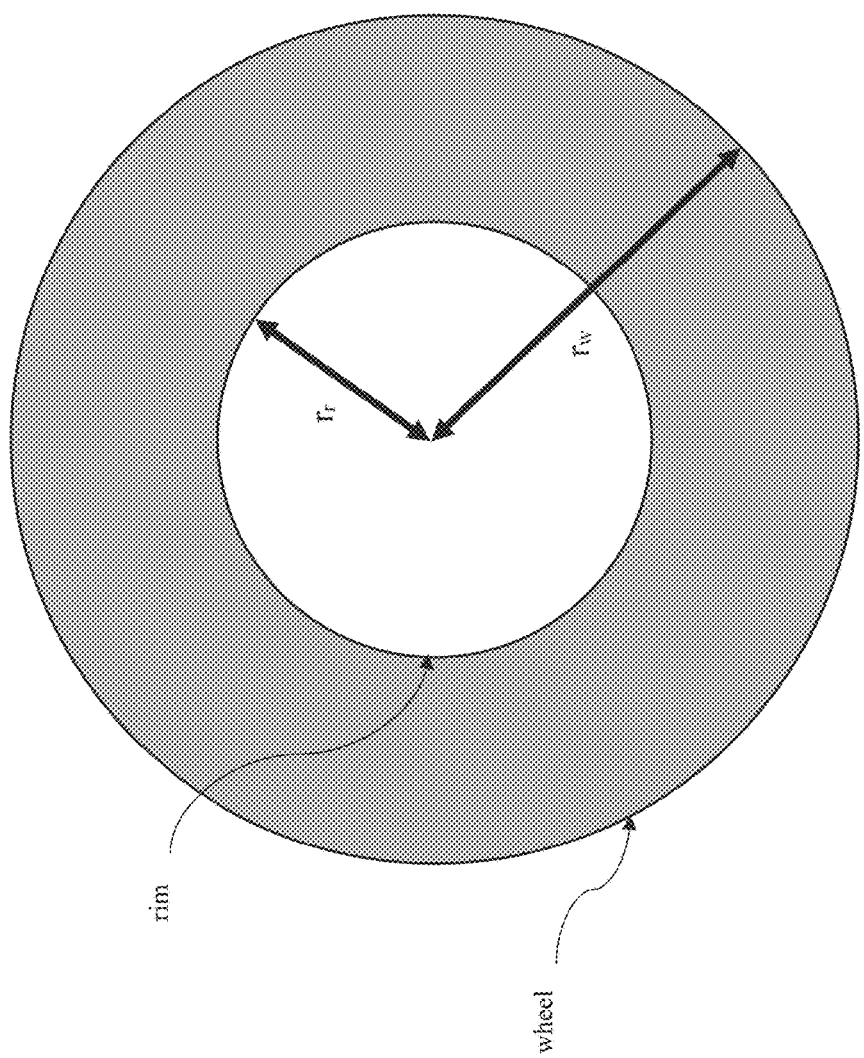
FIG. 10 is an illustration of parameters of a wheel and rim for use in explaining portions of the data analysis used in one preferred embodiment of the present invention.

1. Fc is the force found in ii
2. r is the radius of the rim (where the corrective mass is placed) ($r_r$ in FIG. 10)
3. v is the linear speed of a point on the rim
   a. $v = \omega r_r$
      i. $\omega$ is angular velocity of tire $$\omega = \frac{v}{r_w}$$

1. v is the linear speed of the vehicle
   '2. $r_w$ is the radius of the wheel (See FIG. 10 for illustration)
      ii. $r_r$ is the radius of the rim
390 Place mass on tire at calculated angle II. Determination of Vibrational Anomalies of a Tire/Hub Assembly Using a Tire Balancing Machine In another preferred embodiment of the present invention, which is described with respect to FIGS. 13-17, vibrational anomalies of a tire/hub assembly that is removably mounted to a spindle of a tire balancing machine are determined as follows:

1. An object (device) is attached on a spindle of a tire balancing machine adjacent to the tire/hub assembly that has been previously mounted to the spindle of a tire balancing machine. The object includes one or more IMU's mounted to the object and configured to measure parameters that are used for calculating the vibrational anomalies of the tire/hub assembly during operation of the tire balancing machine. The object in this embodiment differs from the object in the previous embodiment, except for the IMU-related structure.
2. Motion data captured by the one or more IMU's are collected.
3. The collected motion data are processed to determine the presence of one or more vibrational anomalies of the vehicle.
4. A determination is made of a corrective action to be taken when the result of the processed data indicates the presence of one or more vibrational anomalies of the tire/hub assembly.

Figure 13:
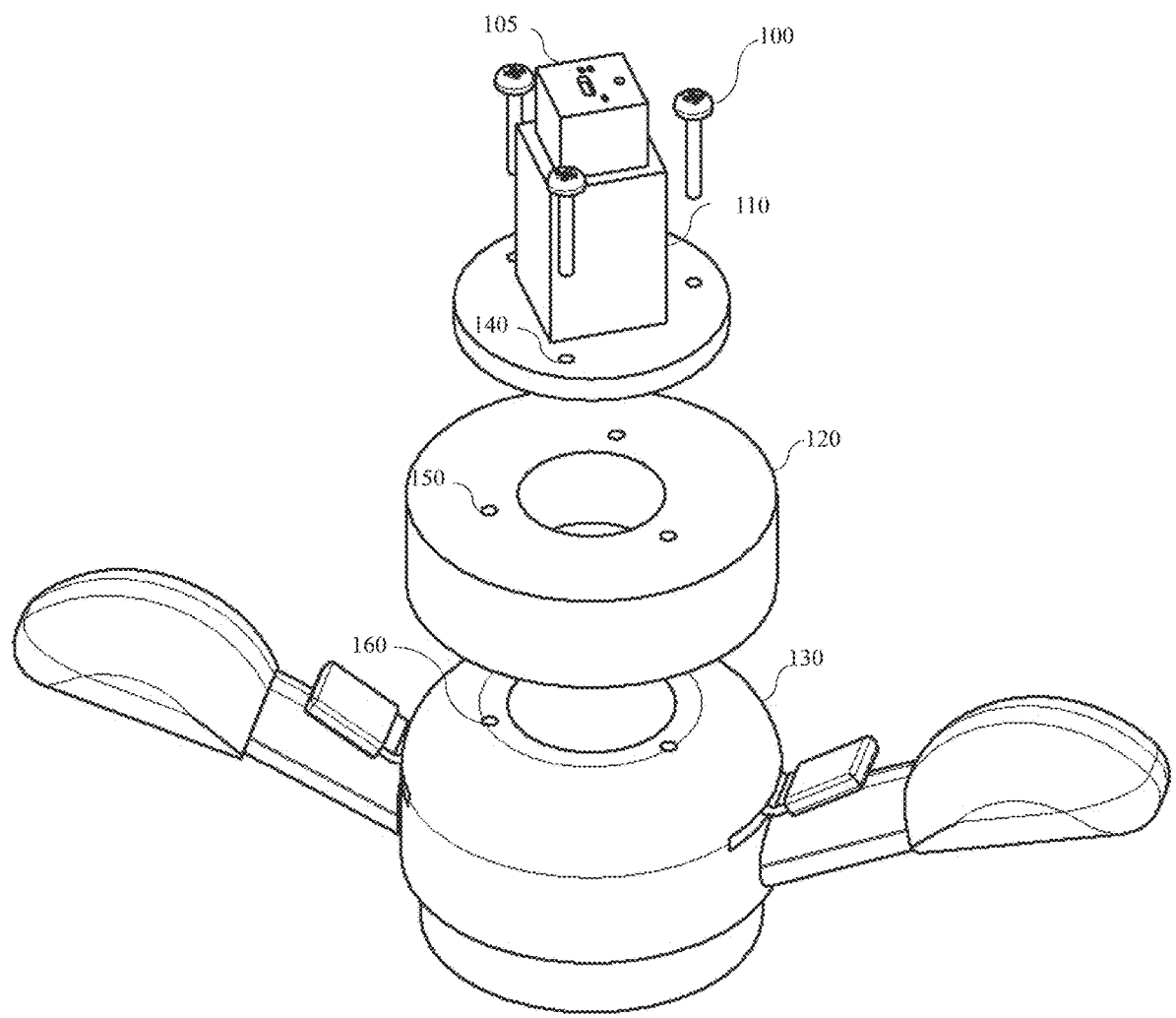
FIGS. 13-17 are schematic diagrams of parts associated with a preferred embodiment of the present invention for determining vibrational anomalies of a tire/hub assembly that is mounted to a tire balancing machine.
Figure 14:
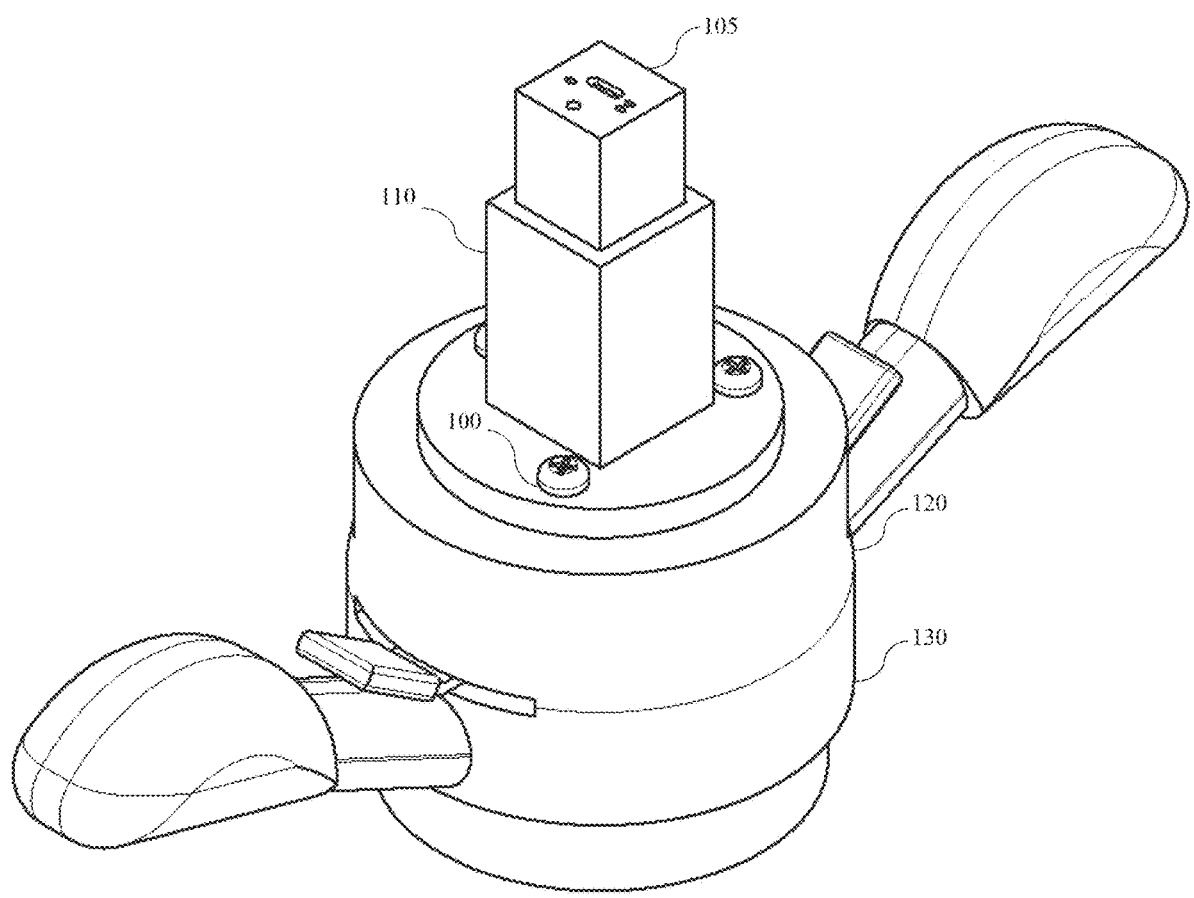
Figure 15:
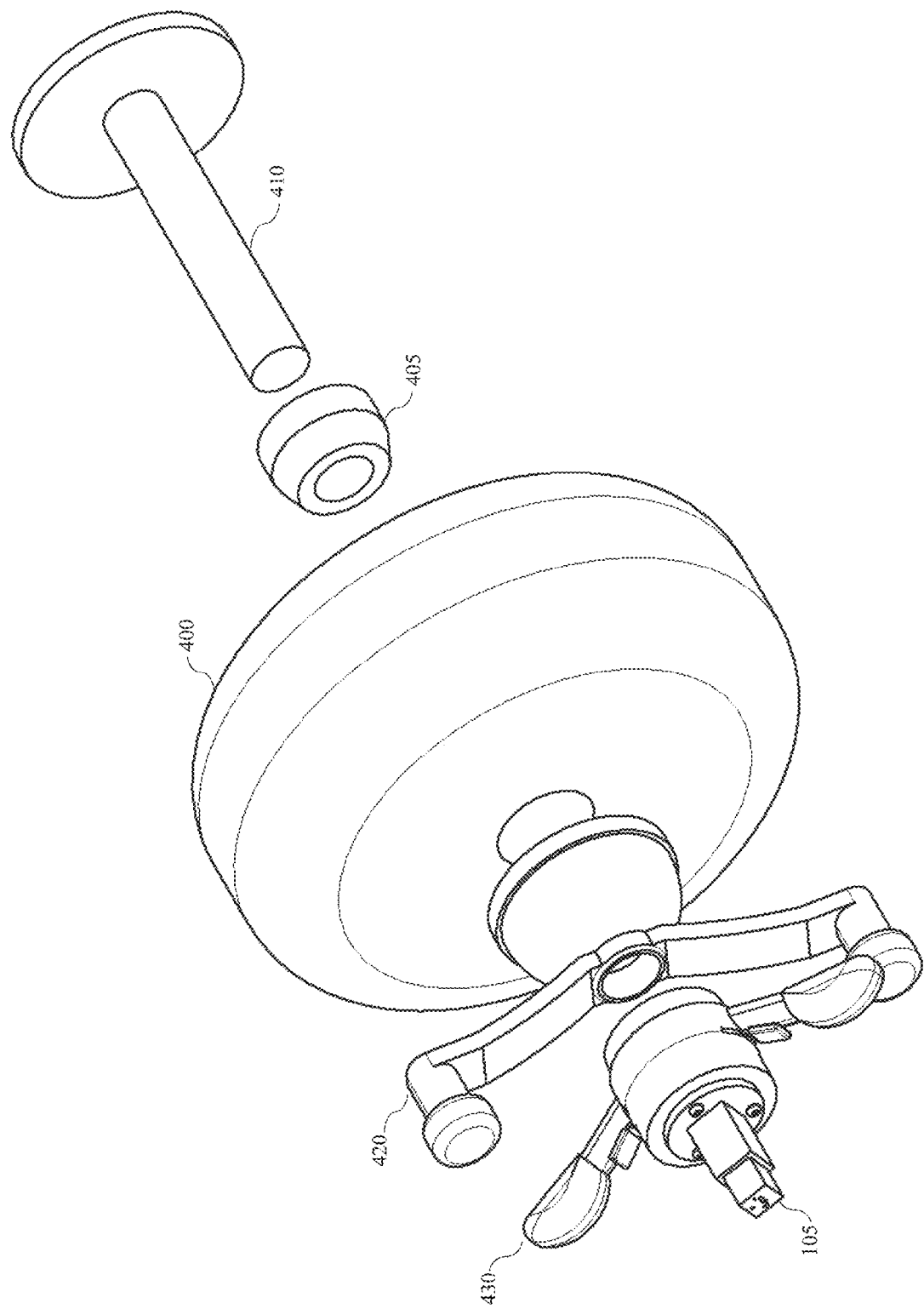
Figure 16:
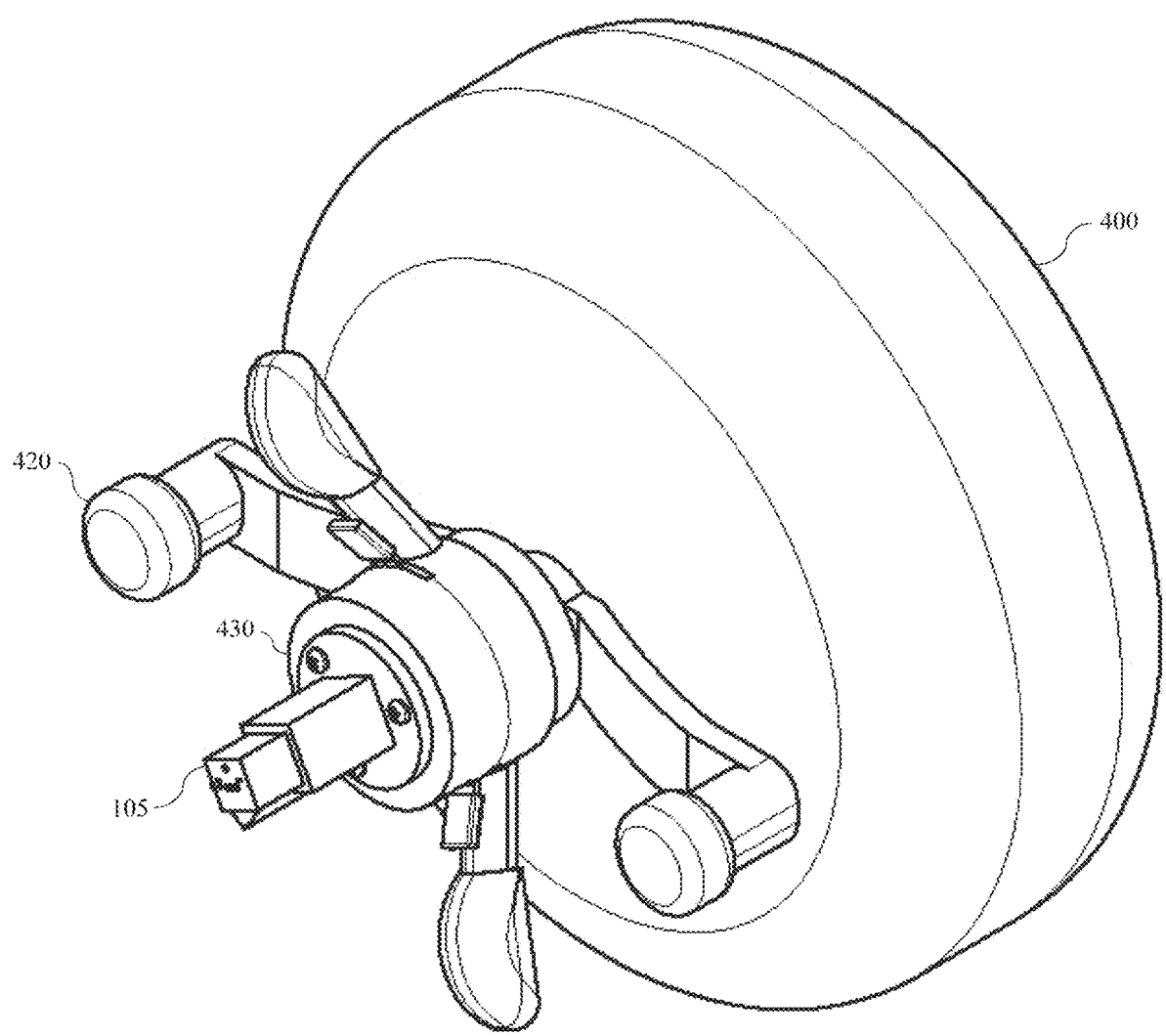

FIG. 13 is an exploded view of the device.
FIG. 14 is an assembled view of the device.
FIG. 15 is an exploded view of how the device is used on a wheel balancer.
FIG. 16 is an assembled view of how the device is used on the wheel balancer.

One suitable wheel balancer is a Hunter Road Force® Elite Wheel Balancer. However, other wheel balancers may be used.

Referring to FIGS. 13-17, the following elements and assembly processes are described.

Figure 17:
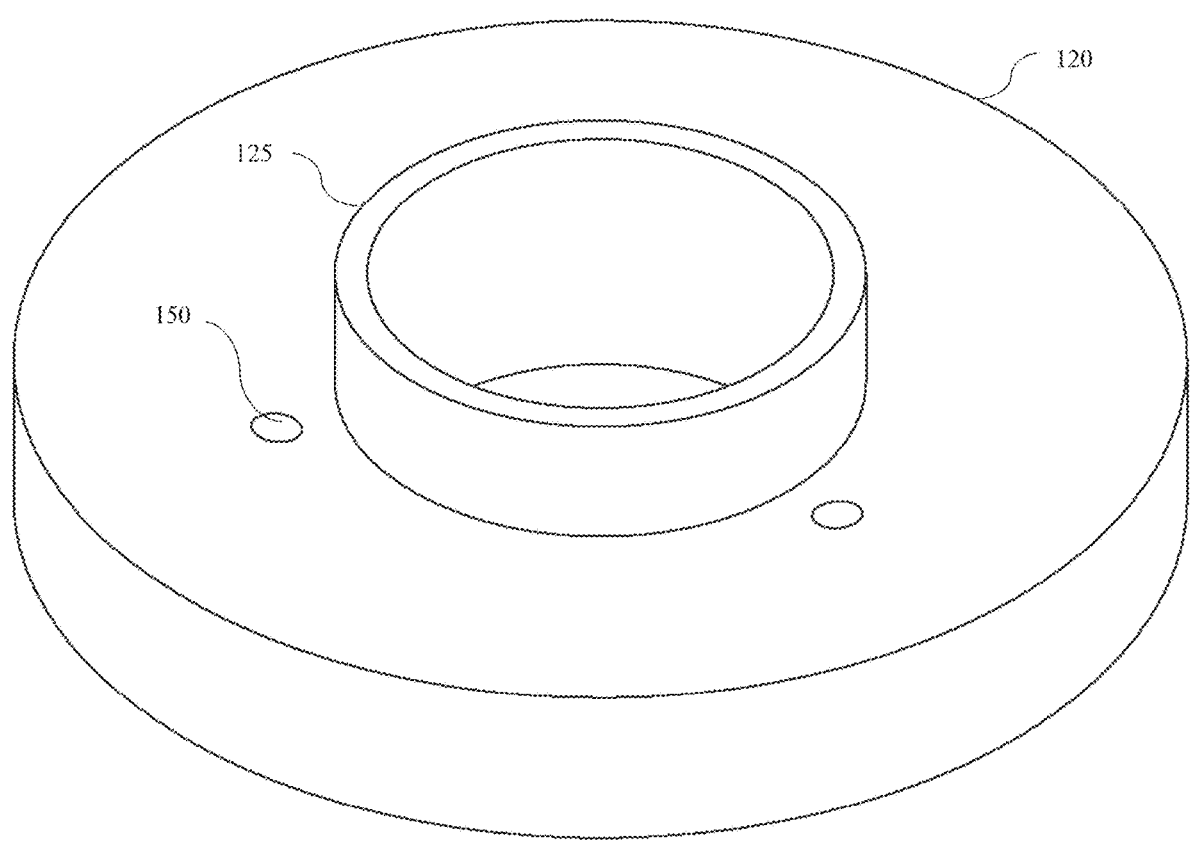
Figure 18A:
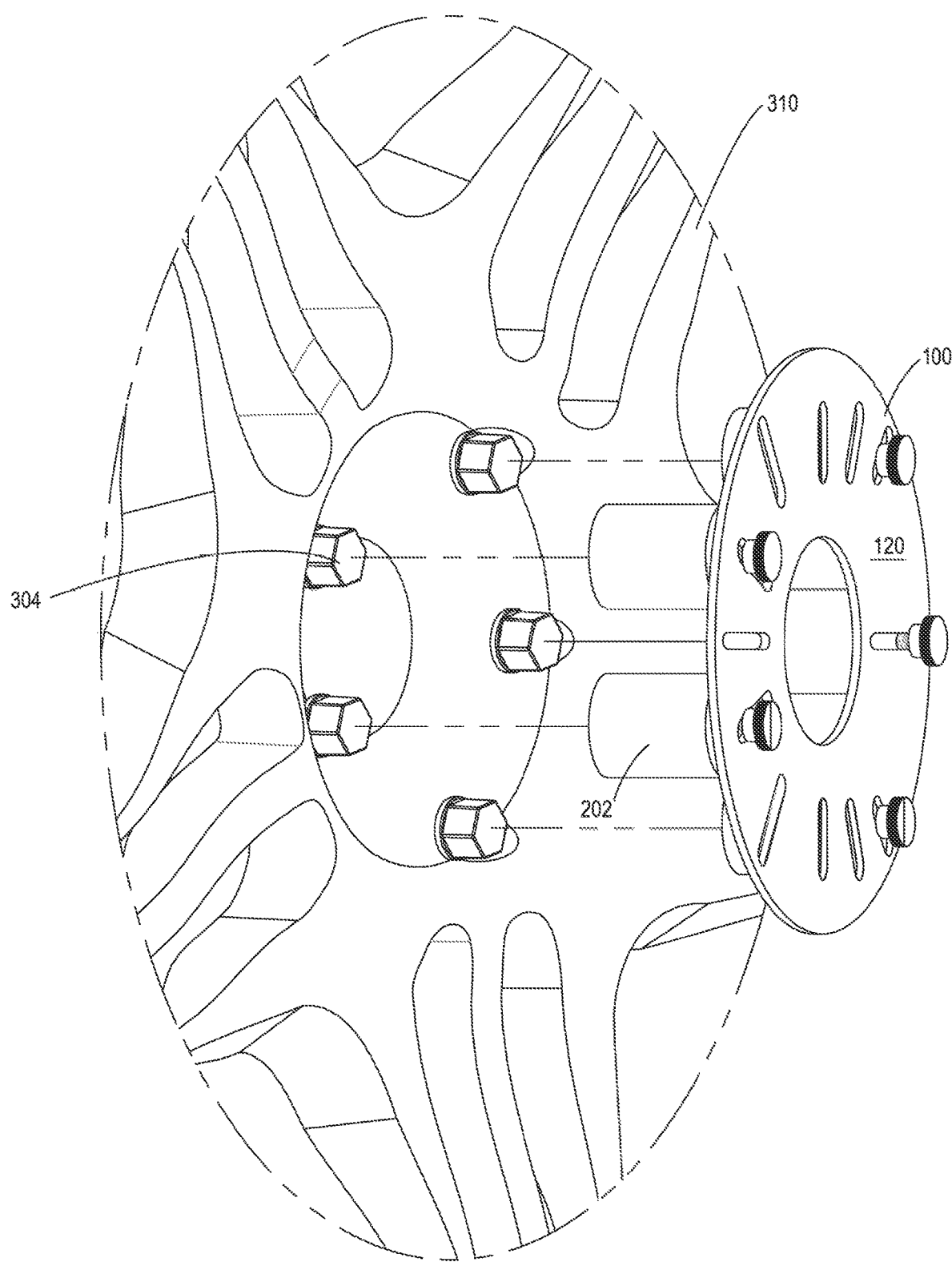
FIGS. 18A and 18B show how the object is removably attached to a tire/hub assembly of a wheel of a vehicle via lugs nuts of the tire/hub assembly by fitting portions of the object over the lug nuts of the tire/hub assembly.
Figure 18B:
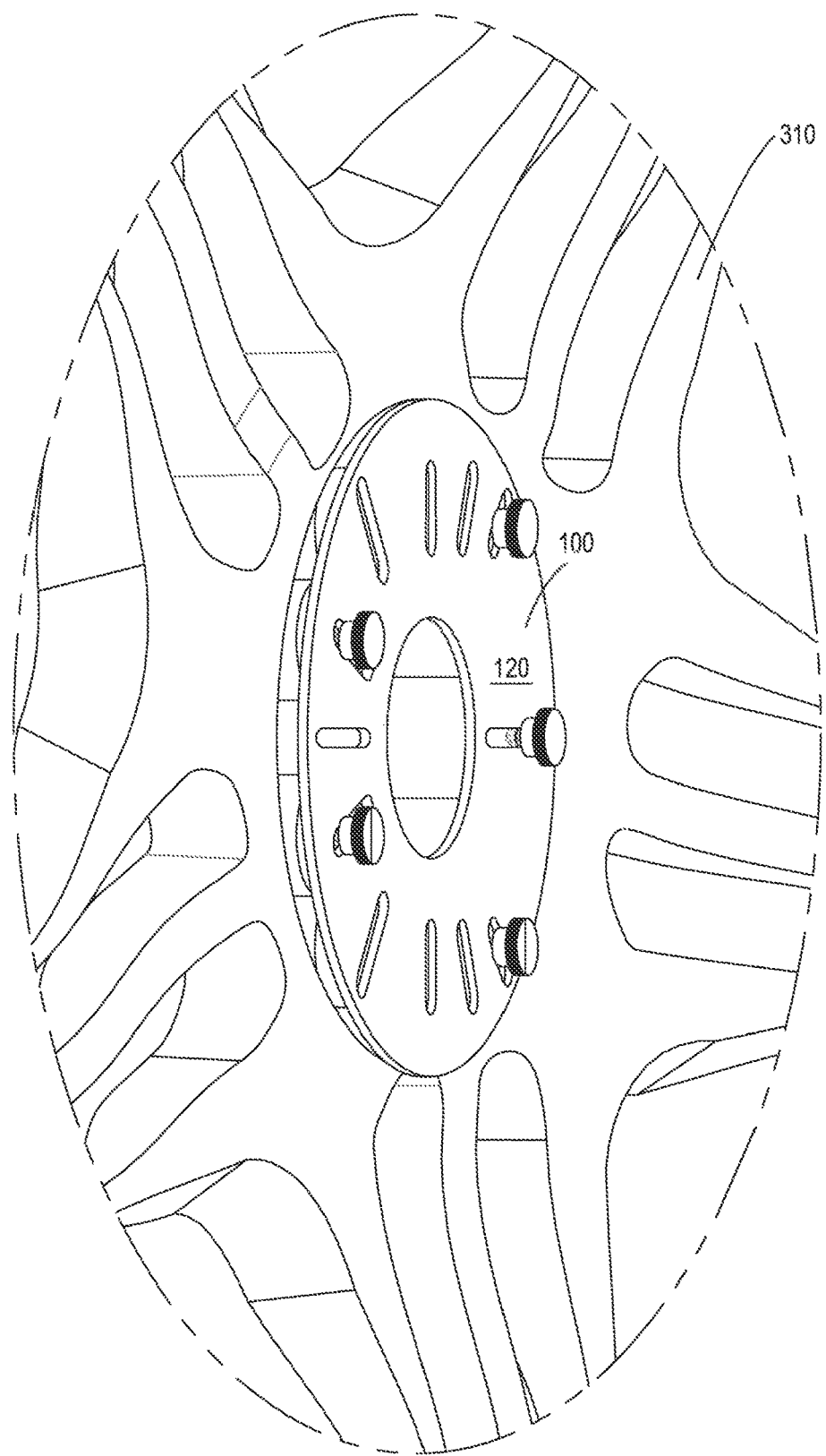

100—machine screws
1. In one suitable application, 10-32×1 inch screws may be used.
2. The screws pass through module holder 110 and adapter 120 to go into T-handle 130.
   a. The holes 140 in the module holder 110 and the holes 150 in the adapter 120 are large enough for the screw 100 to pass through without turning the screw 100.
   b. The holes 160 in the T-handle 130 are large enough so that the screw 100 must be turned in order to insert the screw 100 into the hole 160.
110—module holder. In one suitable embodiment, this part is similar to the corresponding part in U.S. Pat. No. 10,969,292, shown in FIG. 4A and labeled as IMU housing 402, slot 410, and mounting plate 412. This part holds the module 105 (IMU). In this embodiment, there is only a single IMU.
120—adapter
1. This part acts as an interface between the module holder 110 and the T-handle 130.
2. Flat on top to fit the bottom of the module holder
3. Contoured on the bottom to match the top of the T-handle 130.
4. FIG. 17 shows a ring 125 on the bottom of the adapter. The ring 125 in the middle fits snuggly into the hole in the T-handle 130.
530—T-handle 130
1. In one suitable embodiment, this element may be a Yosoo Wheel Balancer Kit (Amazon ASIN #B08R9PCHZT) having the following dimensions:
   Size (L×W×H): Approx. 28×12×14.5 cm/11.0×4.7×5.7 in
   The Top Head Diameter: 8.5 cm/3.3"
   Thread Diameter: 38 mm/1.5"
   Screw Pitch: 3 mm/0.12"
2. Holes drilled to match holes in adapter 120

This assembly is used to attach an IMU to the spindle of the wheel balancer. The wheel 400 (interchangeably referred to herein as a "tire/hub assembly") is secured to the spindle 410 on the wheel balancer as it is normally done with the collet 405 and provided T-handle 420. Device 430 is then threaded onto the spindle 410 as shown in FIG. 15.

When fully assembled, all the components appear as shown in FIG. 16. The threaded rod is not visible since it is behind the wheel and inside the rest of the parts. Depending upon the wheel being balanced, the length of the spindle, and the size of the T-handles (420 and 430), there may or may not be space between the two T-handles (420 and 430).

The procedure used to balance a wheel is followed while the IMU collects data. That data can then be used to verify the information provided by the wheel balancer.

Referring again to FIGS. 13-16, FIG. 14 shows a fully assembled apparatus configured to be removably attached to the spindle 410 of a wheel balancer after the collet 405, the wheel 400, and the T-handle 420 have been attached to the spindle 410. The collet 405 slides on the spindle 410 first. Then the wheel 400 is placed on the spindle so that the collet 405 fits in the hole 403 of the rim. Next, the T-handle 420 is threaded onto the spindle 410 and tightened to firmly affix the wheel 400 to the tire balancing machine. Finally, the device 430 is threaded onto the spindle 410 and tightened to ensure a solid connection between the spindle 410 and the device 430.

The tire balancing machine is then operated in its normal manner, and motion data captured by the IMU is collected and processed as described above.

III. Additional Considerations

A. IMU Calculation

Depending upon processing capacity and software/hardware architecture considerations, calculations of data collected by the IMU may be processed internally within the IMU, external to the IMU (e.g., exported to a cloud service such as AWS), or a combination thereof.

B. Feedback During Testing

In one embodiment, the operator of the vehicle in motion is provided with real-time information that improves the quality of the data collection. For example, at a certain point in the testing process, the operator may be informed to drive at a constant speed for a particular duration of time. The IMU may perform internal calculations which are used for the feedback.

C. Vehicle Speed Data One suitable method for obtaining vehicle speed data is via the On-board diagnostics (OBD) port of the vehicle.

D. Deployment Implementation Features

The use of the device, when deployed as a product, may differ from what is disclosed by way of example herein. For example, data collection preferably begins automatically once the vehicle is determined to be in operation; data collection may occur for an indefinite period of time; later data analysis may be used to determine such parameters as constant speed, acceleration, travel direction (e.g., straight, rounding a curve, uphill, downhill); sequential or analytic determination can be made of one or more vibrational anomalies; feedback to the driver may occur to request certain maneuvers, speeds, and the like.

E. Other Vibrational Anomalies

One skilled in the art would recognize that vibrational anomalies caused by other sources including, but not limited to back firing and worn bearings could be detected by this apparatus.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for determining vibrational anomalies of a vehicle comprising:
   (a) removably attaching an object to a wheel of the vehicle in a manner that inhibits the object from coming off of the vehicle when the vehicle is in operation, wherein the object is removably attached to a tire/hub assembly of the wheel of the vehicle via lug nuts of the tire/hub assembly by fitting portions of the object over the lug nuts of the tire/hub assembly, thereby removably attaching the object to the tire/hub assembly of the wheel of the vehicle without requiring removal of any lug nuts of the tire/hub assembly, the object including one or more inertial measurement units (IMU's) mounted to the object and configured to measure parameters that are used for calculating the vibrational anomalies when the vehicle is in operation;
   (b) collecting motion data captured by the one or more IMU's;
   (c) processing the collected motion data to determine the presence of one or more vibrational anomalies of the vehicle; and
   (d) determining a recommended corrective action to be taken when the result of the processed data indicates the presence of one or more vibrational anomalies of the vehicle.

2. The method of claim 1 wherein the vehicle is a motor vehicle or an electric vehicle, and the determined vibrational anomaly is caused by lateral force variation, and the recommended corrective action is one or more of (i) resetting lug nuts of the wheel, or (ii) inspecting the wheel's rim for potential bent regions.

3. The method of claim 1 wherein the vehicle is a motor vehicle or an electric vehicle, and the determined vibrational anomaly is caused by radial force variation, and the recommended corrective action is one or more of (i) inspecting the wheel's tire for excessive debris and removing any debris, or (ii) inspecting the wheel's tire for excessive wear in a single location and replacing the tire of the wheel when excessive wear in a single location is located, or (iii) attaching a mass at a predefined location designated by the application of the wheel's tire.

4. The method of claim 1 wherein step (c) further comprises further determining the magnitude and location of the source of the one or more vibrational anomalies of the vehicle.

5. A method for determining vibrational anomalies of a tire/hub assembly that is removably mounted to a spindle of a tire balancing machine, the method comprising:
   (a) removably attaching an object on the spindle of the tire balancing machine adjacent to the tire/hub assembly that has been previously mounted to the spindle of a tire balancing machine, the object including one or more inertial measurement units (IMU's) mounted to the object and configured to measure parameters that are used for calculating the vibrational anomalies of the tire/hub assembly during operation of the tire balancing machine;
   (b) collecting motion data captured by the one or more IMU's;
   (c) processing the collected motion data to determine the presence of one or more vibrational anomalies of the vehicle; and
   (d) determining a corrective action to be taken when the result of the processed data indicates the presence of one or more vibrational anomalies of the tire/hub assembly.

* * * * *